(12) United States Patent
Virtzer et al.

(10) Patent No.: US 11,652,376 B2
(45) Date of Patent: May 16, 2023

(54) SYSTEM AND METHOD FOR CLEAN MAGNETIC POWER GENERATION USING PERMANENT MAGNETS AND ELECTRO MAGNETS

(71) Applicants: Yaron Virtzer, Ramat Hasharon (IL); Remez Lev Ari, Herzelia (IL); Moshe Karchevsky, Karmiel (IL)

(72) Inventors: Yaron Virtzer, Ramat Hasharon (IL); Remez Lev Ari, Herzelia (IL); Moshe Karchevsky, Karmiel (IL)

( * ) Notice: Subject to any disclaimer, the term of this patent is extended or adjusted under 35 U.S.C. 154(b) by 0 days.

(21) Appl. No.: 17/429,341

(22) PCT Filed: Jan. 11, 2021

(86) PCT No.: PCT/IL2021/050033
§ 371 (c)(1),
(2) Date: Aug. 8, 2021

(87) PCT Pub. No.: WO2021/144789
PCT Pub. Date: Jul. 22, 2021

(65) Prior Publication Data
US 2022/0045562 A1 Feb. 10, 2022

Related U.S. Application Data

(60) Provisional application No. 62/960,163, filed on Jan. 13, 2020.

(51) Int. Cl.
*H02K 1/27* (2022.01)
*H02K 11/00* (2016.01)

(52) U.S. Cl.
CPC .............. *H02K 1/27* (2013.01); *H02K 11/00* (2013.01)

(58) Field of Classification Search
CPC ................................ H02K 1/27; H02K 11/00
(Continued)

(56) References Cited

U.S. PATENT DOCUMENTS 3,725,705 A * 4/1973 Borinski ................... H01F 6/00
310/308
6,384,503 B1 * 5/2002 Iwaki ................... H02K 1/2786
310/156.47
(Continued)

FOREIGN PATENT DOCUMENTS

EP 2190107 A1 5/2010
FR 2510832 A1 2/1983
(Continued)

OTHER PUBLICATIONS

"Perpetual Motion is Impossible—The Reed Magnetic Motor", Jun. 25, 2013.*
(Continued)

*Primary Examiner* — John K Kim

(57) ABSTRACT

In some embodiments, the present invention may include, for example, systems, devices, and methods for power generation using a permanent magnet and/or an electro magnet installed on a twisted band wheel or wheels and/or installed on stationary discs and plates. Due to magnetic field forces for example between the stationary discs and the twisted band, the twisted band may be driven to move (e.g., rotate), rotation of the twisted band is optionally transferred by an axle to a generator.

12 Claims, 23 Drawing Sheets

(58) Field of Classification Search
USPC .................................... 310/112, 113, 156.01
See application file for complete search history.

(56) References Cited

U.S. PATENT DOCUMENTS

| | | | |
|---|---|---|---|
| 6,822,349 B2 | 11/2004 | Lunz et al. | |
| 8,909,505 B2* | 12/2014 | Heyring | G06T 17/00 |
| | | | 434/301 |
| 2003/0173849 A1* | 9/2003 | Marshall, Jr. | H02K 53/00 |
| | | | 310/156.01 |
| 2004/0041474 A1* | 3/2004 | Lunz | H02K 41/031 |
| | | | 310/13 |
| 2011/0049892 A1* | 3/2011 | Ross | H02K 53/00 |
| | | | 310/113 |
| 2011/0050018 A1* | 3/2011 | Rogers | H02K 53/00 |
| | | | 310/113 |
| 2011/0101814 A1* | 5/2011 | Finkle | H02K 21/028 |
| | | | 310/156.83 |
| 2013/0187586 A1* | 7/2013 | Murray, III | H02P 25/0925 |
| | | | 310/46 |
| 2015/0333584 A1* | 11/2015 | McMullen | H02K 1/278 |
| | | | 310/156.28 |
| 2017/0110917 A1* | 4/2017 | Freixas Vila | H02K 1/27 |
| 2019/0036399 A1 | 1/2019 | Yamada et al. | |
| 2019/0260277 A1* | 8/2019 | Ikemoto | H02K 1/22 |
| 2022/0045562 A1* | 2/2022 | Virtzer | H02K 49/104 |

FOREIGN PATENT DOCUMENTS

| | | |
|---|---|---|
| JP | 2005143207 A | 6/2005 |
| JP | 2006217786 A | 8/2006 |

OTHER PUBLICATIONS

"Perpetual Motion Machines" by O. Knill, Math21a lecture from Harvard.edu, printed on Sep. 9, 2022.*

* cited by examiner

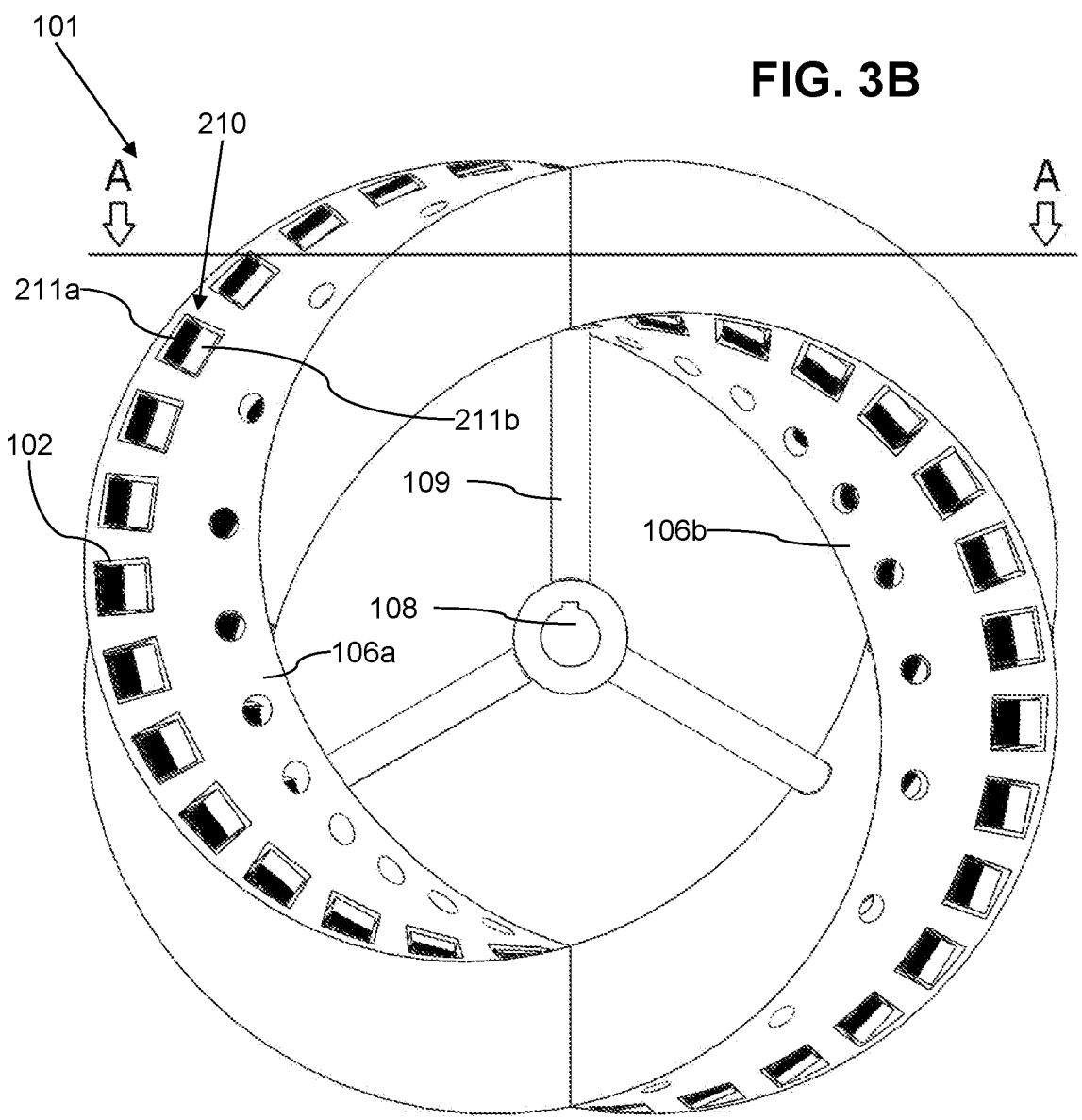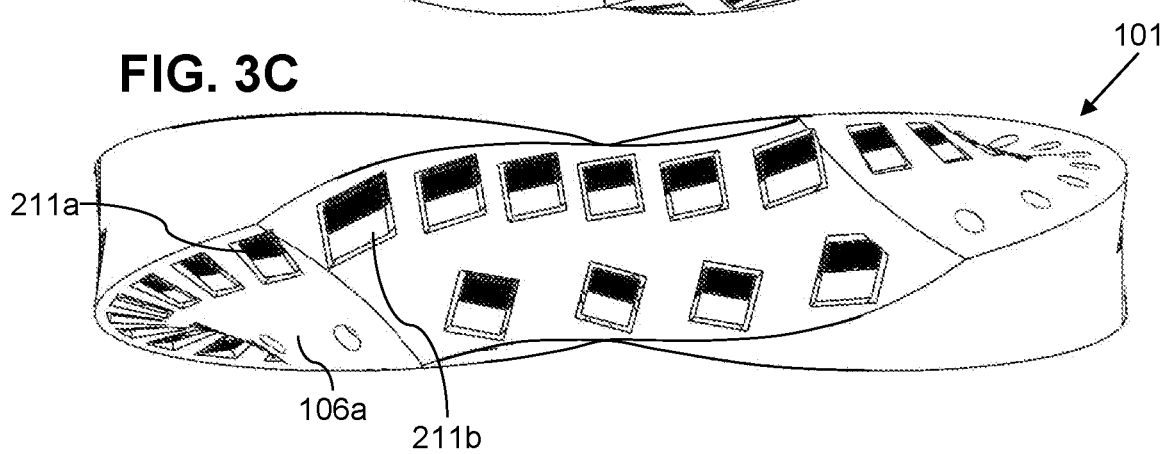

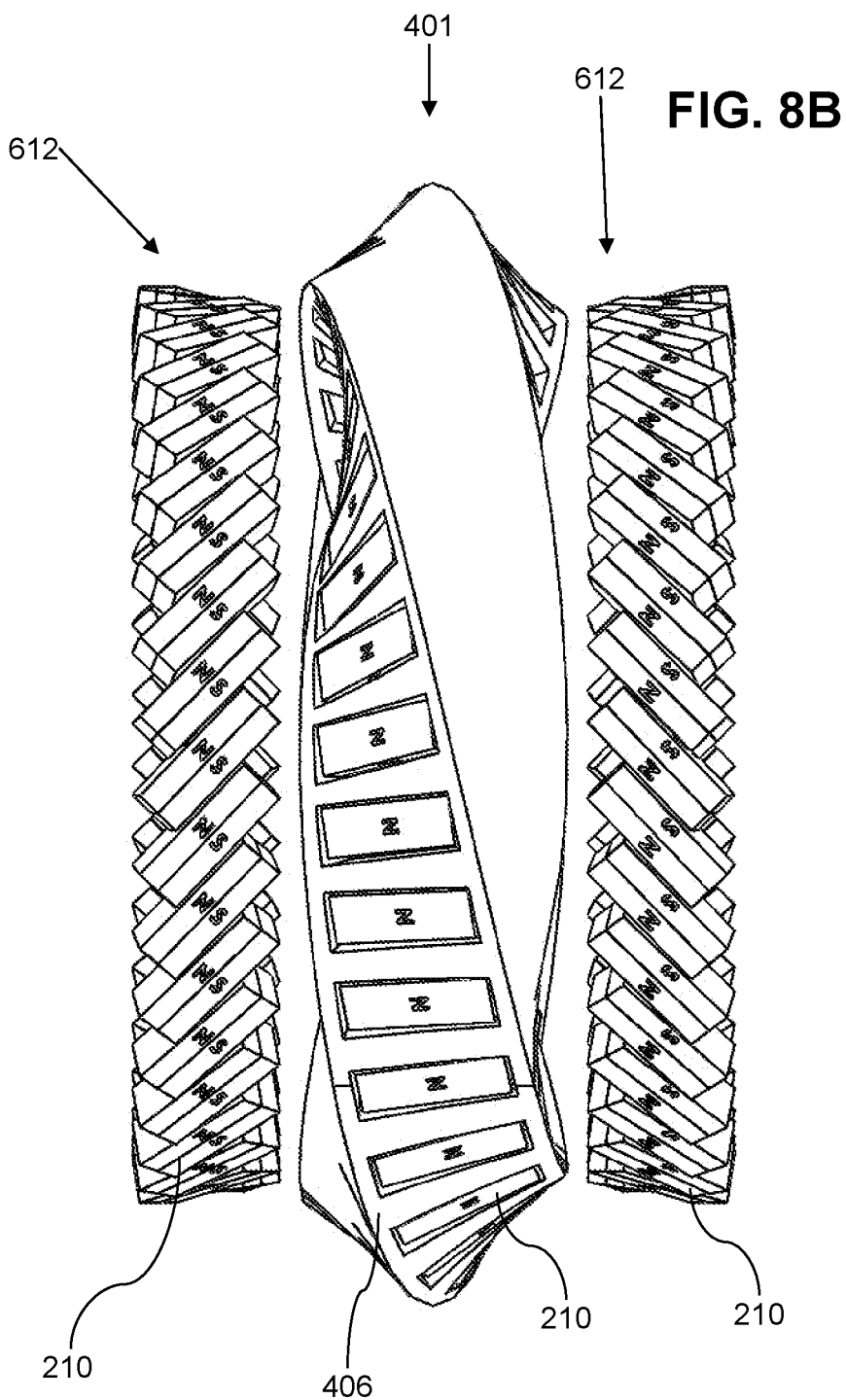

SYSTEM AND METHOD FOR CLEAN MAGNETIC POWER GENERATION USING PERMANENT MAGNETS AND ELECTRO MAGNETS

RELATED APPLICATION/S

This application claims the benefit of priority under 35 USC § 119(e) of U.S. Provisional Patent Application No. 62/960,163 filed 13 Jan. 2020, the contents of which are incorporated herein by reference in their entirety.

FIELD AND BACKGROUND OF THE INVENTION

The present invention, in some embodiments thereof, relates to an efficient motor and/or generator and, more particularly, but not exclusively, to a motor based on balanced magnets.

SUMMARY OF THE INVENTION

According to an aspect of some embodiments of the invention, there is provided a system for power generation including: a first array of magnets variable oriented according to a surface of a twisted band; a second array of magnets having a fixed orientation; wherein interaction between the first array of magnets and the second array of magnets rotates a rotor; wherein power from rotation of the rotor is used to generate electrical power.

According to some embodiments of the invention, the first array is on the rotor and the second array is on a stator.

According to some embodiments of the invention, the system the second array is circular.

According to some embodiments of the invention, a pair of the stators are mounted on opposite sides of the rotor.

According to some embodiments of the invention, the rotor includes a twisted band and wherein magnets of the first array are mounted to the twisted band with an axis between poles of the magnet parallel to a surface of the band which the magnets cross.

According to some embodiments of the invention, magnets of the first array are mounted to the twisted band with an axis between poles of the magnet perpendicular to an edge of the surface.

According to some embodiments of the invention, the rotor includes a twisted band and wherein magnets of the first array are mounted to the twisted band with an axis between poles of the magnet perpendicular to a surface of the band.

According to some embodiments of the invention, the second array is on the rotor and the first array is on a stator.

According to some embodiments of the invention, the rotor drives a generator.

According to some embodiments of the invention, the system further includes a shell of a standard battery and wherein the generator is packaged in the shell and supplies a standard power output as a battery.

According to some embodiments of the invention, the electric power is used to drive an electromagnet of a further stage generator. a third array of magnets variable oriented according to a surface of a second twisted band; a fourth array of magnets having a fixed orientation; wherein at least one of the third and fourth array includes the electromagnet; wherein interaction between the first array of magnets and the second array of magnets rotates a rotor; wherein power from rotation of the rotor is used to generate electrical power.

According to some embodiments of the invention, the twisted band is a mobius strip.

According to some embodiments of the invention, the twisted band is twisted.

According to an aspect of some embodiments of the invention, there is provided a method of generating electrical power including: supplying a first array of magnets having fixed alignment; supplying a second array of magnets having progressively changing alignment in accordance to a twisted band; rotating the first array with respect to the second array; and converting power from the rotating to electricity.

According to some embodiments of the invention, the first array is on a stator and the second array is on a rotor.

According to some embodiments of the invention, the rotor drives an axle that drives a generator.

According to some embodiments of the invention, the electricity is used in place of a battery.

According to some embodiments of the invention, the electricity is used as an input for a further stage generator.

According to some embodiments of the invention, the electricity is used for a municipal power grid.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disc and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3B is a schematic illustration of a twisted band with several permanent magnets installed thereon in dedicated locations and orientations in accordance with an embodiment of the current invention;

FIG. 3C is a schematic cross section of a twisted band with several permanent magnets installed thereon in dedicated locations and orientations in accordance with an embodiment of the current invention;

FIG. 8B is a schematic illustration of the positioning of magnets in the driving portion of a magnetic generator in accordance with an embodiment of the current invention;

DESCRIPTION OF SPECIFIC EMBODIMENTS OF THE INVENTION

Overview

Figure 1A:
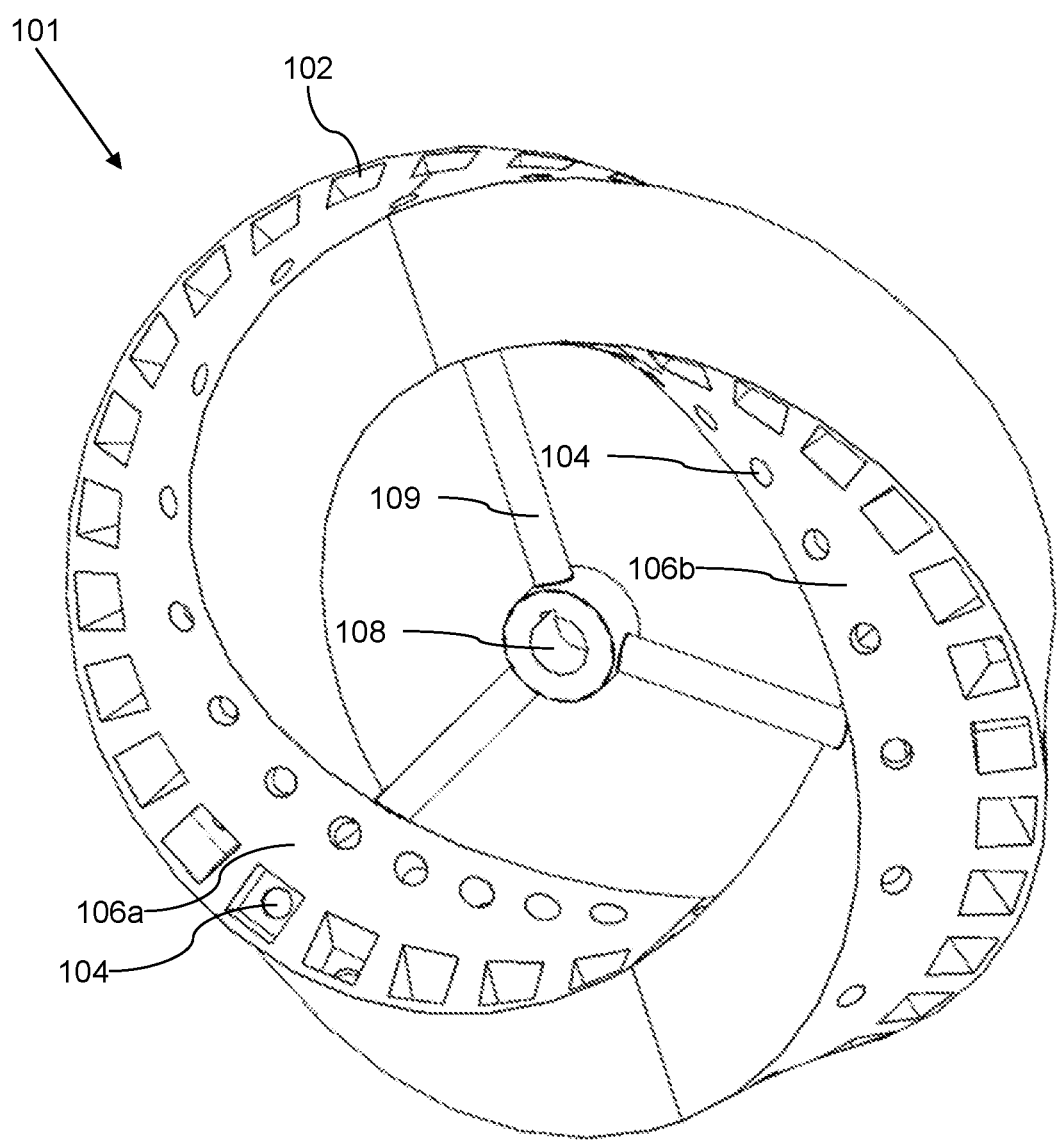
FIG. 1A is a schematic illustration of a twisted band configured to be mounted on an axle, in accordance with some demonstrative embodiments of the present invention.

The present invention, in some embodiments thereof, relates to an efficient motor and/or generator and, more particularly, but not exclusively, to a motor based on balanced magnets.

Millions of people worldwide utilize electric devices and appliances on a daily basis. Some of these devices are powered by an internal battery or power cell. Other devices receive electric power from an electric outlet or socket, which in turn receives electric power over a conducting wire from a remote power plant or power station.

As the demand for electric devices increases, and as new types of electric devices are introduced and are utilized by individual consumers and business entities alike, there is an increased demand for electric power. Owners or operators of power plants use various ways to produce electric power; for example, combustion of liquid fuels (e.g., petroleum), combustion of solid fuels (e.g., coal), using solar panels or photovoltaic panels, using wind-based energy production systems, or the like.

Due to magnetic field forces for example between the stationary discs and the twisted band, the twisted band may be driven to move (e.g., rotate). rotation of the twisted band is optionally transferred by an axle to a generator. Note that in some embodiments, rather than actually twisted the band of the ring, magnets may be installed into an untwisted ring and/or plate at angles that correspond to the angle of a corresponding twisted ring. For the sake of the current disclosure, the term twisted ring may also apply to any ring or disc where there are magnets attached around the ring at angles corresponding to an angle of twist of a twisted ring.

For example, a basic Clean Magnetic Power Generation System for generating electricity may include: (a) A stationary disc/plate with several permanent magnets \ optionally installed on the disc/plate in dedicated locations and/or specific orientations. In some embodiments, the disc/plate may be held stationary (e.g., secured to a system chassis). Optionally, the disc/plate may include a suitable hole and/or a ball bearing facilitating an axle passing through the disc/plate and/or rotating. In some embodiments, permanent magnets in the disc/plate push and/or pull by magnetic field forces a rotating twisted band. The twisted band, optionally, contains permanent magnets. (b) A twisted band optionally includes several permanent magnets. For example, the magnets may be installed in dedicated locations and/or specific orientations. Optionally, the permanent magnets push and pull by magnetic field forces the twisted band. Due to magnetic field forces the twisted band moves and/or rotates. (c) The twisted band is optionally connected to an axle. For example, rotation of the axle may be facilitated by several ball bearing installed on system chassis or on a stationary discs/plates. (d) An optional Gear Box transfers high twisted band speed to the slower wheel speed and increasing torque. The gear box output is optionally connected to generator (e.g., the generator may produce AC or DC current according to application). (e) For example, an AC Generator may generate electric AC power. Alternatively or additionally, a DC Generator may generate DC power. (f) Optionally, the system includes a capacitor and/or a super capacitor charging module. The charger module may optionally include a smart charge capacitor controller. For example, the controller facilitates input and/or output current limiting (e.g., for safety and/or protection) and/or automatic capacitor cells balancing. (g) In some embodiments a capacitor and/or supercapacitor is used for DC energy storage (e.g., like battery), (h) A DC-to-DC converter may optionally be included. For example, the DC to DC converter may include an electronic circuit device that converts a source of direct current (DC) from one voltage level to another. Alternatively or additionally, the DC-to-DC converter may include a controller. For example, the controller may support input or output current limiting (e.g., safety and protection); (i) The controller optionally includes safety and protection circuits, power circuits, internal and external control signals, communication circuits, switching and/or a processor. For example, the controller may be enabled to turn on and turn off the magnetic power generator system.

In some embodiments, an advanced clean Magnetic Power Generation system for generating electricity may include one or all of the following stages:

A first stage including: (a) A stationary disc/plate may include for example, several permanent magnets installed on the disc/plate in dedicated locations and/or specific orientations. The plate may optionally include a suitable hole or ball bearing, for example to facilitate movement of the axle. The disc/plate permanent magnets optionally push and/or pull by magnetic field forces a rotating twisted band. (b) A rotating twisted band may include several permanent magnets installed in dedicated locations and/or specific orientations. Optionally, the permanent magnets push and/or pull by magnetic field forces the twisted band. Due to magnetic field forces the twisted band may move and/or rotate the axle. (c) The twisted band is optionally connected by a mechanical structure to the axle. Free movement of the axle is optionally facilitated by several ball bearing installed on system chassis and/or on a stationary discs/plates. (d) A Gear Box is an optional device which transfers high speed rotation of the twisted band to a slower wheel speed and/or increasing torque. The gear box output movement is optionally connected to a generator; (e) The generator may include for example a DC Generator generating electric DC power and/or an AC generator generating AC power. (f) The system may include a capacitor/super capacitor charging module which is optionally a smart charge capacitor including a controller. For example, the controller may support input and/or output current limiting (safety and protection) and/or automatic capacitor cell balancing. (g) The Capacitor/supercapacitor is optionally used for energy storage. (h) The system optionally includes a DC-to-DC converter. For example, the DC to DC converter may include an electronic circuit device that converts a source of direct current (DC) from one voltage level to another. For example, it may include a type of electric power converter. The DC-to-DC converter optionally includes a controller. The controller may support, for example, input or output current limiting (e.g., for safety and protection). (i) The system may include electronic command and/or control contains safety and/or protection circuits, power circuits, internal and external control signals. The command and/or controller circuit may optionally enable turning on and/or turning off the magnetic power generator system.

a second stage including for example: (a) an optional stationary disc/plate with several low electro magnets (e.g., that get the power from a control module—e.g., the first stage). The low electro magnets are optionally installed on the disc/plate in dedicated locations and/or specific orientations. The disc/plate may include, for example, a suitable mount and/or passage for an axle. For example, the passage may include a hole with a ball bearing which allows the movement of the axle with respect to the disc/plate. The disc/plate with several low electro magnets optionally pushes and/or pulls by magnetic field forces a twisted band. (b) The twisted band with several permanent magnets installed in dedicated locations and/or specific orientations is optionally mounted movably with respect to the disc/plate. For example, the permanent magnets push and pull by magnetic field forces the twisted band. The magnetic field forces optionally cause the twisted band to move (e.g., rotate). (c) The twisted band is optionally connected by mechanical structure to an axle. Free rotation of the axle is optionally facilitated by several ball bearing installed on system chassis and/or on a stationary discs/plates. (d) An optional Gear Box optionally transfer high twisted band speed to the slower wheel speed and/or increases torque. The gear box output movement may be connected, for example, to a generator. (e) For example, the generator may include a DC generator, e.g., to generate electric DC power. (f) A capacitor and/or super capacitor charging module may be included. The charging module optionally includes a smart charge capacitor controller which support for example input or output current limiting (e.g., for safety and/or protection) and/or automatic capacitors cell balancing. (g) Optionally a capacitor/supercapacitor is used for energy storage. (h) The system optionally includes a DC-to-DC converter. For example, the converter includes an electronic circuit device that converts a source of direct current (DC) from one voltage level to another. For example, it may include a type of electric power converter. The DC-to-DC converter optionally includes a controller which may support for example input or output current limiting (for safety and/or protection). In some embodiments, the DC-to-DC converter is controlled by the command-and-control controller. The DC-to-DC converter output power of the "second stage" may be connected to the disc/plate with several medium electro magnets of a "third stage".

Note: the size of the stationary discs/plates and the size of the twisted band of the "second stage" is optionally bigger than the size of the stationary discs/plates and twisted band of the "first stage".

A Third stage including for example: (a) a stationary disc/plate with several medium electro magnets (e.g., that get the power for example from DC-to-DC converter of the second stage). The several medium electro magnets are optionally installed on the disc/plate in dedicated locations and/or specific orientations. The disc/plate optionally includes a suitable mount and/or passage for an axle. The disc/plate medium electro magnets optionally push and/or pull (e.g., by magnetic field forces) a twisted band; (b) This stage optionally includes a twisted band with several permanent magnets. For example, the magnets may be installed in dedicated locations and/or specific orientations. The permanent magnets optionally push and/or pull (e.g., by magnetic field forces) the twisted band, for example, due to forces between the twisted band and the plate/disc. Due to the forces, the twisted band optionally moves (e.g., rotates with respect to the stationary disc/plate). (c) The twisted band is optionally connected by mechanical structure to axle. Free movement of the axle is optionally facilitated by several ball bearing installed on system chassis and/or on the discs/plates; (d) An optional Gear Box is may transfer high twisted band speed to the slower wheel speed and increasing torque. The gear box output movement is optionally connected to generator. (e) The generator may include an optional DC Generator may generate electric DC power. (f) An energy storage unit may include a capacitor/super capacitor charging module and/or a smart charge capacitor controller. (g) A Capacitor/supercapacitor is optionally used for energy storage. (h) The stage may include a DC-to-DC converter and/or a controller. The DC-to-DC converter of the "third stage" optionally connects to high electro magnets of the disc/plate of the "fourth stage".

Note: the size of the stationary discs/plates and the size of the twisted band of the "third stage" is optionally bigger than the size of the stationary discs/plates and twisted band of the "second stage".

A Fourth stage including: (a) An optional stationary disc/plate with several high electro magnets (e.g., receiving power from DC-to-DC converter of the third stage). Several high electro magnets are optionally installed on the disc/plate in dedicated locations and/or specific orientations. Optionally the stationary disc/plate includes a suitable mount and/or passage allowing movement (e.g., rotation) of an axle. The disc/plate high electro magnets optionally push and/or pulls (e.g., by magnetic field forces) a twisted band; (b) In some embodiments, the twisted band includes several permanent magnets installed in dedicated locations and/or specific orientations. For example, the permanent magnets push and pull by magnetic field forces the twisted band. Forces may optionally move (e.g., rotate) the twisted band. (c) The twisted band is optionally connected by mechanical structure to an axle. Free movement of the axle is optionally facilitated by several ball bearing installed on system chassis or on a stationary discs/plates. (d) An optional Gear Box transfers high twisted band speed to the slower wheel speed and increasing torque. The gear box output movement is optionally supplied to a generator; (e) For example, the generator may include a DC Generator generating electric DC power; (f) An energy storage module optionally includes a capacitor/super capacitor and/or a smart charge capacitor controller which supports for example input or output current limiting (e.g., for safety and/or protection), automatic capacitors and/or cells balancing. (g) A capacitor and/or supercapacitor is optionally used for energy storage. (h) Optionally a DC to DC converter includes an electronic circuit device that converts a source of direct current (DC) from one voltage level to another. Optionally a controller supports for example input or output current limiting (safety and protection). In some embodiments, the DC-to-DC converter is controlled by a controller. In some embodiments, the DC-to-DC converter output power of the "fourth stage" in connected to the disc/plate very high electro magnets of the "fifth stage".

Note: the size of the stationary discs/plates and the size of the twisted band of the "fourth stage" is optionally bigger than the size of the stationary discs/plates and twisted band of the "third stage".

A Fifth stage optionally includes: (a) An optionally stationary disc/plate may include several very high electro magnets (e.g., that may receive the power from DC-to-DC converter of the fourth stage). The several very high electro magnets are optionally installed on the disc/plate in dedicated locations and/or specific orientations. The disc/plate optionally includes a suitable passage and/or mount for an axle. The disc/plate optionally pushes and/or pulls (e.g., by magnetic field forces) a twisted band; (b) A twisted band, optionally includes several permanent magnets installed in dedicated locations and/or specific orientations. In some embodiments, the permanent magnets may push and/or pulled by magnetic field forces and/or cause the twisted band to move. For example, the magnetic field forces may move (e.g., rotate) the twisted band. (c) The twisted band is optionally connected by a mechanical structure to the axle. Free movement of the axle is optionally facilitated by several ball bearing installed on system chassis or on a stationary discs/plates. (d) Optionally a Gear Box transfers high twisted band speed to the slower wheel speed and/or increasing torque. The gear box output movement is optionally connected to a generator (e.g., an AC or DC according desired output); (e) For example, a DC generator may be included. Optionally, the generator generates electric DC power. Alternatively or additionally an AC generator may be included (e.g., to generate electric AC power). (f) An optional capacitor/super capacitor charging module may include a smart charge capacitor controller. For example, the controller may support input or output current limiting (e.g., for safety and protection), and/or automatic capacitors cells balancing. (g) Optionally, a Capacitor/supercapacitor is used for energy storage. (h) In some embodiments, the stage includes a DC-to-DC converter. A controller is optionally included. For example, the controller may convert a source of direct current (DC) from one voltage level to another. The DC-to-DC converter optionally includes a controller which supports, for example, input or output current limiting (safety and protection); the DC-to-DC converter is optionally controlled by the controller. The DC-to-DC converter output power of the "fifth stage" may be channeled through a DC to AC converter and/or to DC-to-DC converter (according to desired output). The output power is optionally safety protected for example by the electronic command and control module of the "first stage".

Note: the size of the stationary discs/plates and the size of the twisted band of the "fifth stage" are optionally bigger than the size of the stationary discs/plates and twisted band of the "fourth stage".

In some embodiments, the present invention includes, systems, devices, and methods for power generation using a permanent magnet and electro magnet which are installed on a twisted band wheel or wheels and/or installed on discs and plates. Due to magnetic field forces the twisted band moves (e.g., rotates) with respect to the discs, energy from rotation of the twisted band movement be transferred by an axle to a generator. Alternatively or additionally, the twisted band remains stationary while the plate/disc may rotate and/or rotate an axle.

In some embodiments, the present invention provides a power generating energy based on magnet resources and/or is capable of increasing energy production by using an electromagnet.

In some embodiments, the magnetic power generation system of the present invention does not pollute the environment and/or creates zero pollution.

The Applicants have realized that with the rapid consumption of non-renewable resources of oil and natural gas, development and utilization of new energy sources, particularly renewable energy, may be beneficial and advantageous.

The Applicants have realized that as a result, conventional power plants are not widely spread and their remote or rural or non-urban locations further require expensive or costly infrastructure for power delivery and/or power distribution towards populated areas or urban areas.

Some embodiments, of the present invention solves, mitigate, avoid and/or eliminate the problems discussed above, Applicants have realized that coal, natural gas, and petroleum continue to be leading sources of energy production in the United States as well as in other countries (e.g., at the time of writing natural gas is appears to be approximately 30%, petroleum is around 36%, coal is around 16%); and that it is important or even essential to explore alternative and/or clean energy sources to meet society's growing energy needs. Embodiments, of the unique magnetic power generator system of the present invention, which may be implemented be located anywhere at consumer's sites and supply electricity to consumers without the high costs associated with the current modes of energy production (power distribution due to far distance between the power plant to consumers at cities).

In some embodiments, the present invention may provide other and/or additional benefits or advantages.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1A is a schematic illustration of a twisted band configured to be mounted on an axle, in accordance with some demonstrative embodiments of the present invention. In some embodiments a twisted band 101 has a $2\pi$ twist (e.g., a twisted band can be formed by taking an elongated shape for example a rectangular box and/or a cuboid and twisting it and then bending it around and connecting the opposite ends together to form a band, for example a twisted band with a $1\pi$ twist is a mobius strip). In some embodiments, the band may be twisted $1\pi$ or $2\pi$ or $3\pi$ or $4\pi$ or $5\pi$ or $6\pi$ or $7\pi$ or $8\pi$.

Figure 2:
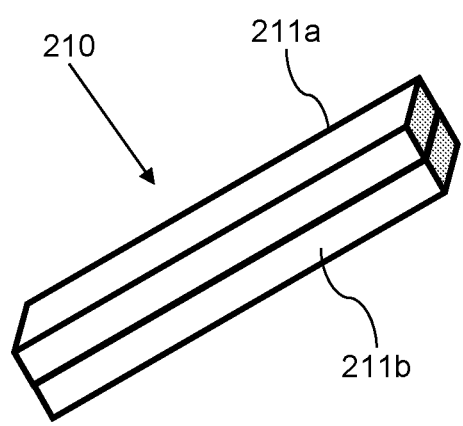
FIG. 2 is a schematic view of a rectangular magnet 210 in accordance with an embodiment of the current invention.

Optionally the band includes mounts 102 for magnets. For example, Mounts 102 include fitted indentations (e.g., rectangular hollow fitting a rectangular magnet e.g., as illustrated in FIGS. 2 and 3). The mounts are optionally arranged along a twisted surface 106a and/or each band oriented at a different angle and/or perpendicular to local angle of the twisted surface 106a. Optionally, the mount opens to a through hole 104 opening to an opposite surface 106b (second twisted surface which closer to second magnetic plate/disc). For example, through holes 104 may open between a back surface of the band and a magnet mount 102. Optionally, through holes of 104 may facilitate removing the magnet from mount 102.

In some embodiments, the twisted band 101 is configured for rotating and/or rotation around an axle. For example, the band 101 may be attached to an axle mount 108. Optionally, axle mount 108 is rigidly attached the band 101 by spokes 109.

Figure 1B:
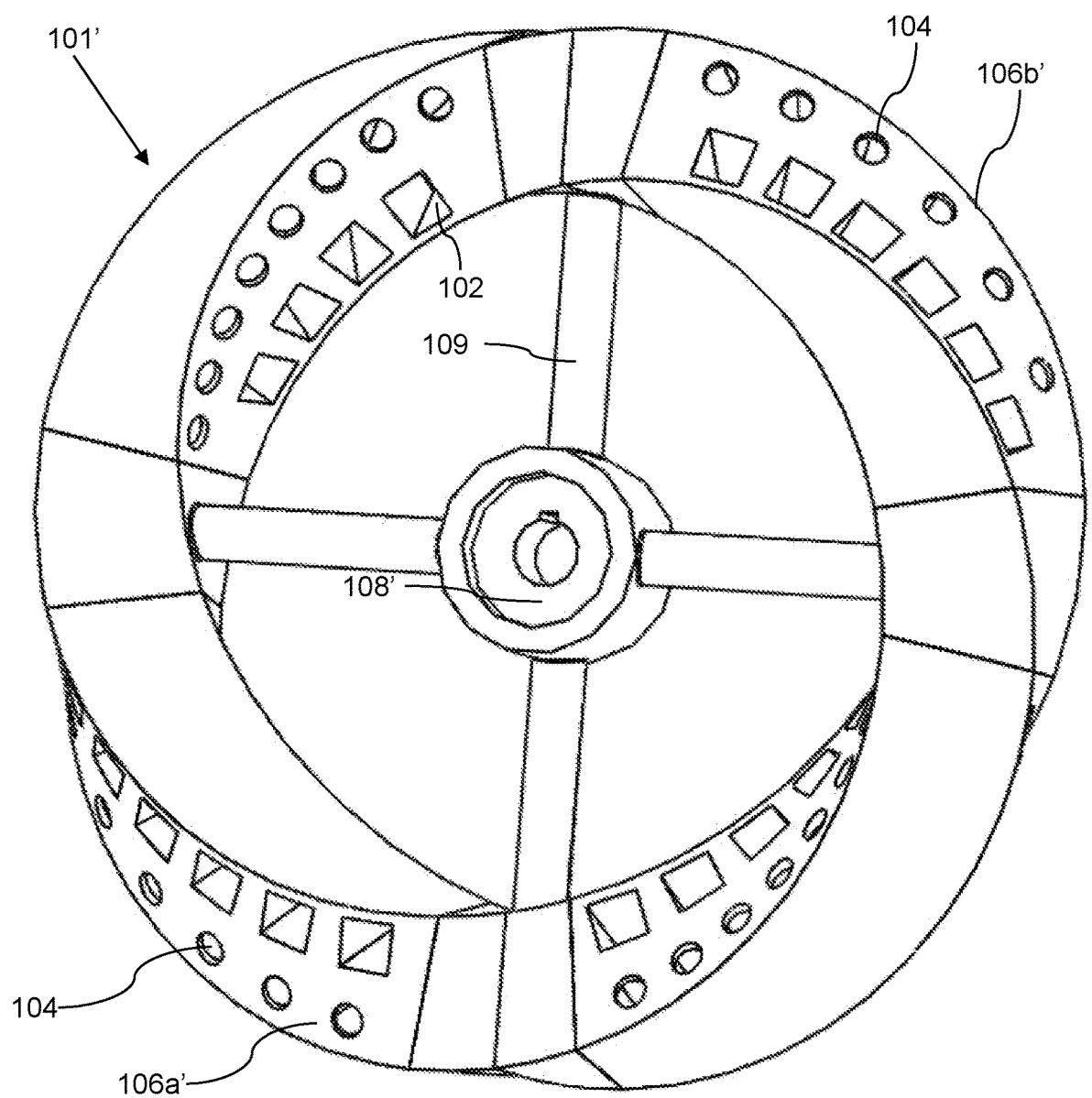
FIG. 1B is an alternative schematic illustration of a twisted band configured to be mounted on an axle, in accordance with some demonstrative embodiments of the present invention.

FIG. 1B is an alternative schematic illustration of a twisted band 101' configured to be mounted on an axle, in accordance with some demonstrative embodiments of the present invention. For example, the magnet mounts 102 of band 101' are mounted a on opposite sides 106a' and 106b' of the band. For example, the band 101 may be attached to an axle mount 108'. Optionally, axle mount 108' is rigidly attached the band 101' by spokes 109.

FIG. 2 is a schematic view of a rectangular magnet 210 in accordance with an embodiment of the current invention. For example, the magnet may include a North pole 211a and/or a South pole 211b.

Figure 3A:
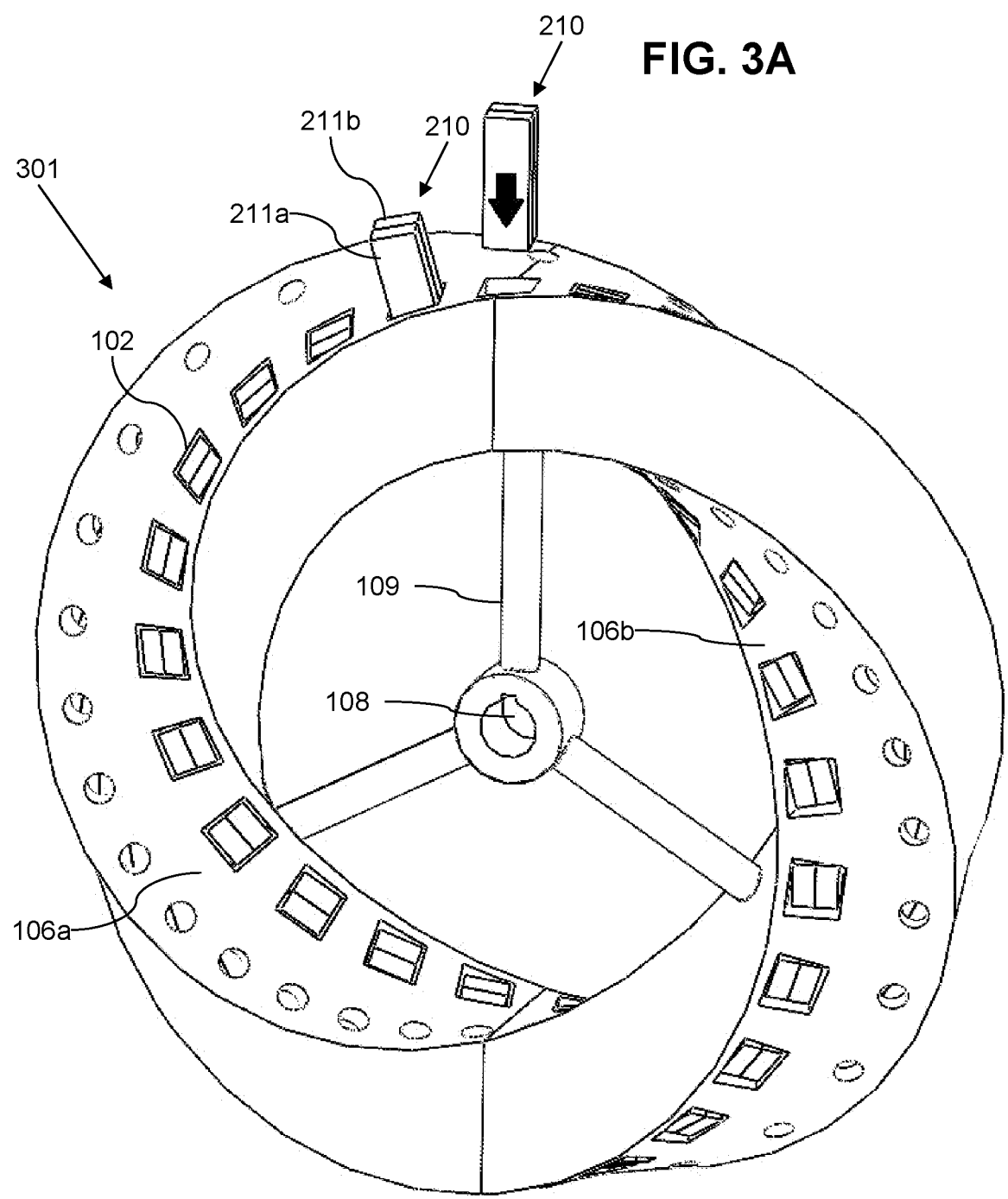
FIG. 3A is a schematic illustration of a twisted band with several permanent magnets installed thereon in dedicated locations and orientations in accordance with an embodiment of the current invention.

FIG. 3A is a schematic illustration of a twisted band 301 with several permanent magnets 210 (e.g., rectangular bar magnets 210 magnetized through the diameter alternatively or additionally, the magnets may be magnetized through the length and/or may have a different shape) installed thereon in dedicated locations and orientations in accordance with an embodiment of the current invention. For example, magnets 210 are installed with an axis joining the poles of the magnets parallel to the twisted face 106a of the twisted band 301 and/or perpendicular to the nearest edge of that surface (thus the orientation of the magnets changes progressively in accordance with the angle of the surface and/or with the angle of the edge of the twisted band. Alternatively or additionally, an axis joining the poles of the magnets may be perpendicular to the twisted face 106a of the twisted band 101 and/or parallel to the nearest edge of that surface.

FIG. 3B is a schematic illustration of a twisted band 101 with several permanent magnets (e.g., rectangular magnets 210) installed thereon in dedicated locations and orientations in accordance with an embodiment of the current invention. In the drawing the North pole 211a of the magnets is colored black and the South pole 211b white.

FIG. 3C is a schematic illustration of cross section of twisted band 101 across plane A-A with several permanent magnets (e.g., rectangular magnets 210) installed thereon in dedicated locations and orientations in accordance with an embodiment of the current invention. In the drawing the North pole 211a of the magnets is colored black and the South pole 211b white.

Figure 4A:
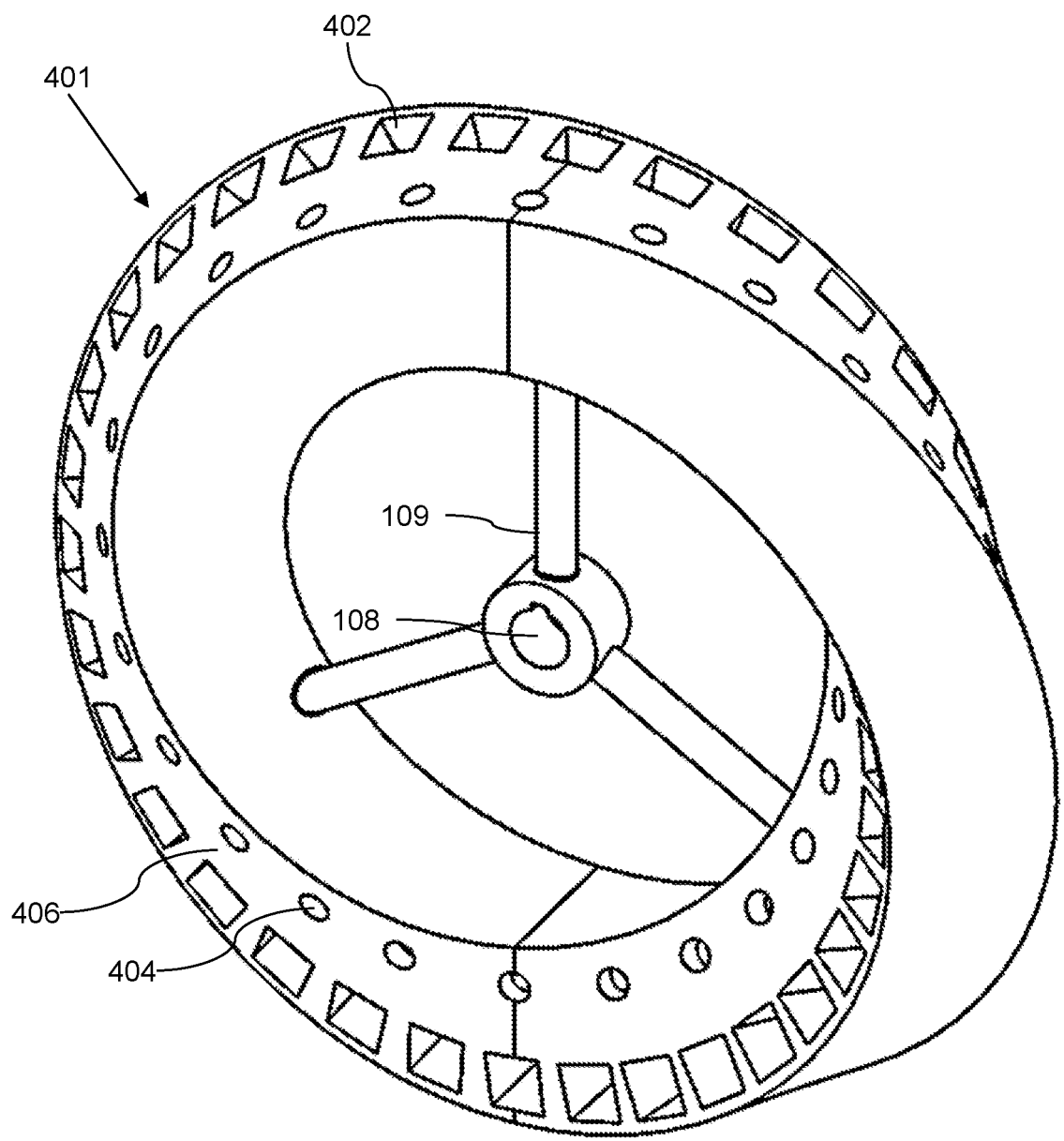
FIG. 4A is a schematic illustration of a Mobius strip twisted band in accordance with an embodiment of the current invention.

FIG. 4A is a schematic illustration of a Mobius strip twisted band 401 in accordance with an embodiment of the current invention. In some embodiments a twisted band 401 has a $\pi$ twist (e.g., is a mobius strip). Optionally the band includes mounts 402 for magnets. For example, mounts 402 include fitted indentations (e.g., rectangular hollow fitting a rectangular magnet e.g., as illustrated in FIGS. 2 and 3). The mounts are optionally arranged along a twisted surface 406 and/or each band oriented at a different angle and/or perpendicular to local angle of the twisted surface 406. Optionally, the mount opens to a through hole 404 opening to an opposite surface 406 (note on a mobius strip the face 406 and opposing surfaces 406 are in fact on long connected surface). For example, through holes 404 may open between a back surface of the band and a magnet mount 402. Optionally, through holes of 404 may facilitate removing the magnet from mount 402. Optionally a twisted band may have any angle twist for example $\pi$, $2\pi$, $3\pi$, $4\pi$, $5\pi$, $6\pi$ $7\pi$ and/or $8\pi$ twisted. Alternatively or additionally, the magnets in the band may oriented according to a twisting pattern similar to a twisted band although the band itself may not be twisted.

Figure 4B:
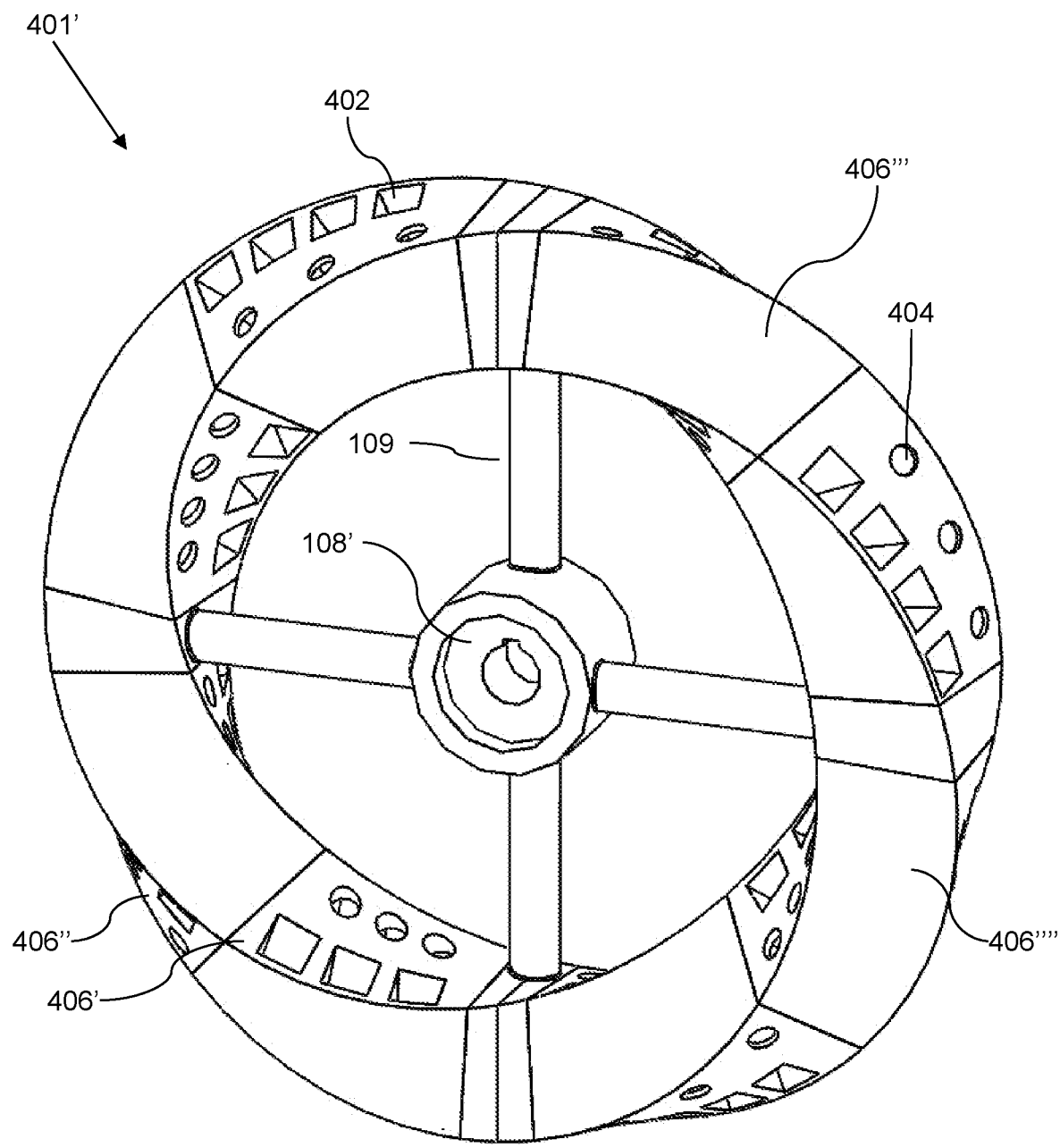
FIG. 4B is a schematic illustration of an alternative twisted band in accordance with an embodiment of the current invention.

FIG. 4B is a schematic illustration of an alternative twisted band 401' in accordance with an embodiment of the current invention. Optionally, magnet mounts 402 are positioned on band 406' on four different sides 406', 406", 406''' and 406''''. In some embodiments, of magnet mounts 402 are mounted in groups along the band 401' on perpendicular faces. For example, one group of mounts 402 may be mounted on part of face 406' and in a further group of mounts 402 may be positioned in continuation on a perpendicular face 406".

Figure 5:
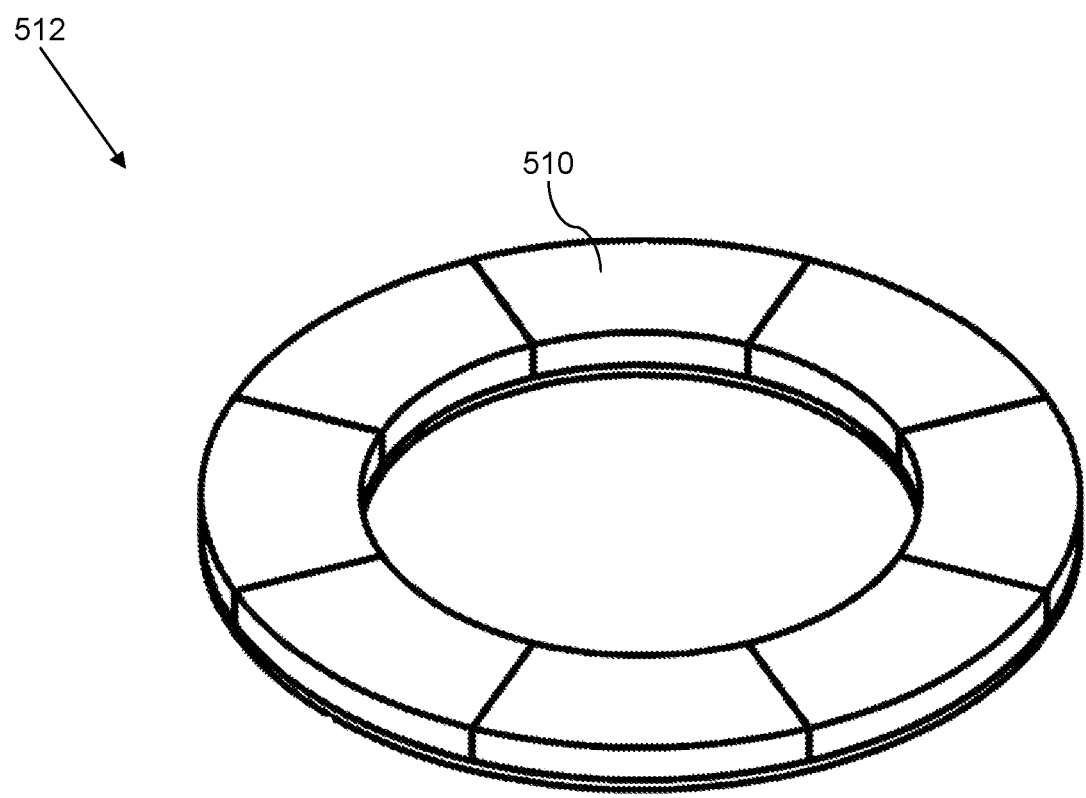
FIG. 5 is an illustration of a magnetic disc/plate 512 in accordance with an embodiment of the current invention.

FIG. 5 is an illustration of a magnetic disc/plate 512 in accordance with an embodiment of the current invention. In some embodiments, a series of magnets 510 are arranged around the disc/plate 512. Optionally, the magnets may be arranged in the same polar orientation (for example with the north poles all on one face of the plate/disc and the South poles on the opposites face).

Figure 6:
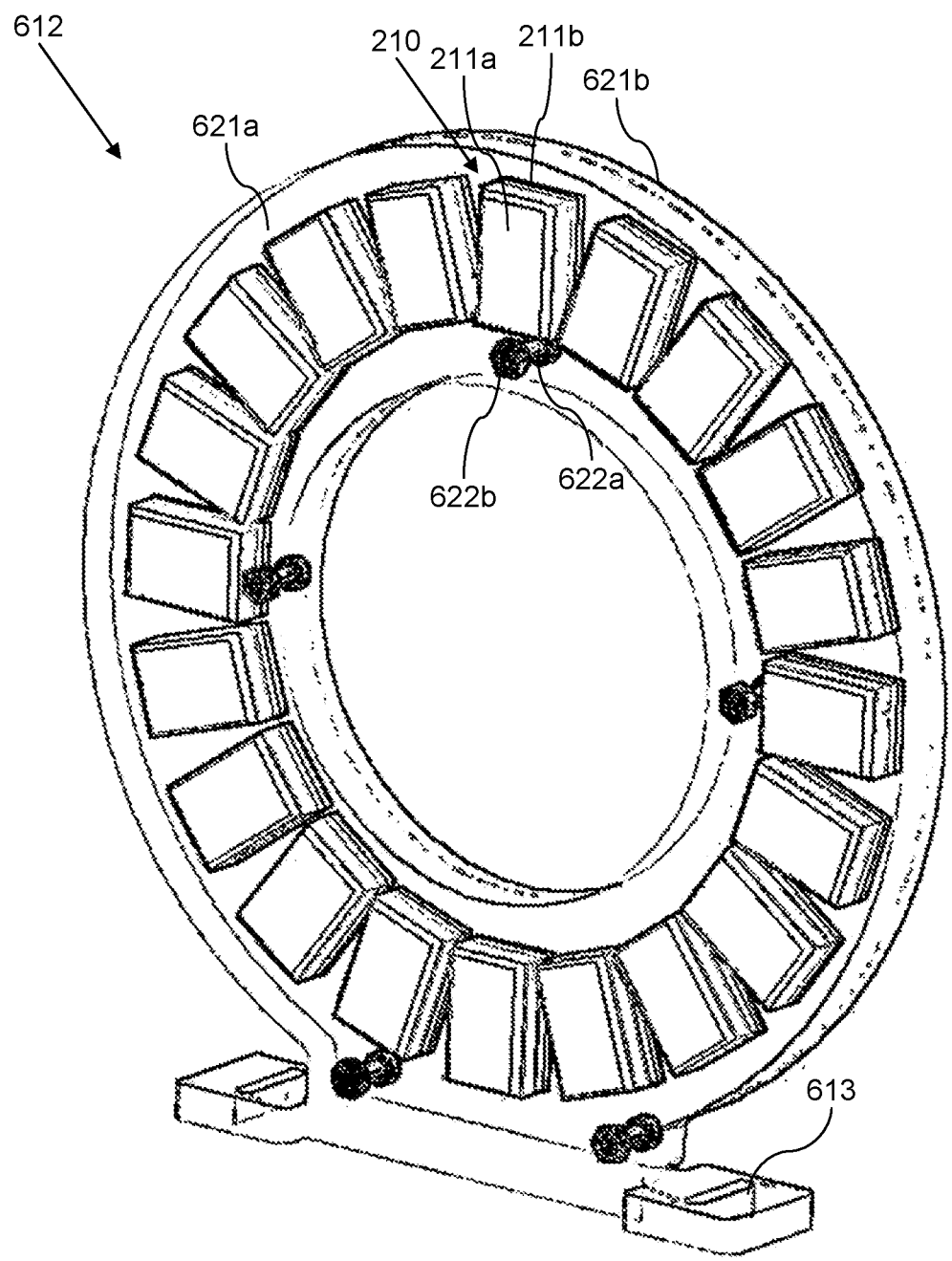
FIG. 6 is an illustration of a magnetic disc/plate 612 in accordance with an embodiment of the current invention.

FIG. 6 is an illustration of a magnetic disc/plate 612 in accordance with an embodiment of the current invention. Optionally, magnets 210 may be arranged circularly around in a circular pattern around the plate. For example, the magnets may be permanent magnets 210 arranged with opposite polls on opposite sides of the disc/plate. Alternatively or additionally, the magnets may include electromagnets whose orientation and/or magnetic field strength may be changed by changing an applied current. For example, the electromagnets may be used as a motor to drive movement and/or start movement of a rotating band.

Figure 7:
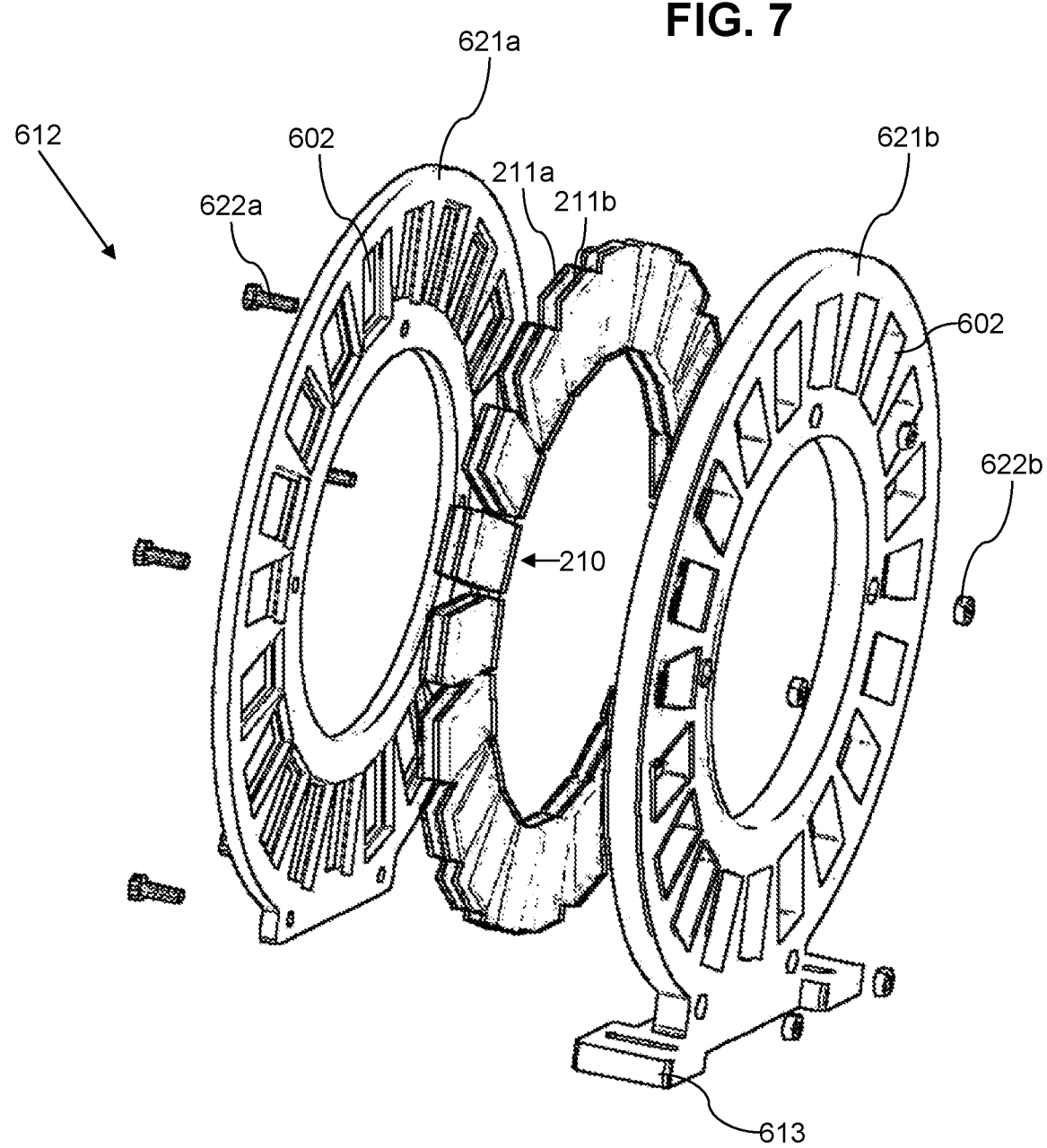
FIG. 7 is an exploded view of a disc/plate 612 in accordance with an embodiment of the current invention.

FIG. 7 is an exploded view illustration of a disc/plate for mounting magnets in accordance with an embodiment of the current invention. For example, permanent magnets 210 (and/or electromagnets) are fixed in a circular array of mounts 602 between two discs 621a, 621b. Optionally, the permanent magnets are all oriented with the same orientation of the poles 211a, 211b.

Figure 8A:
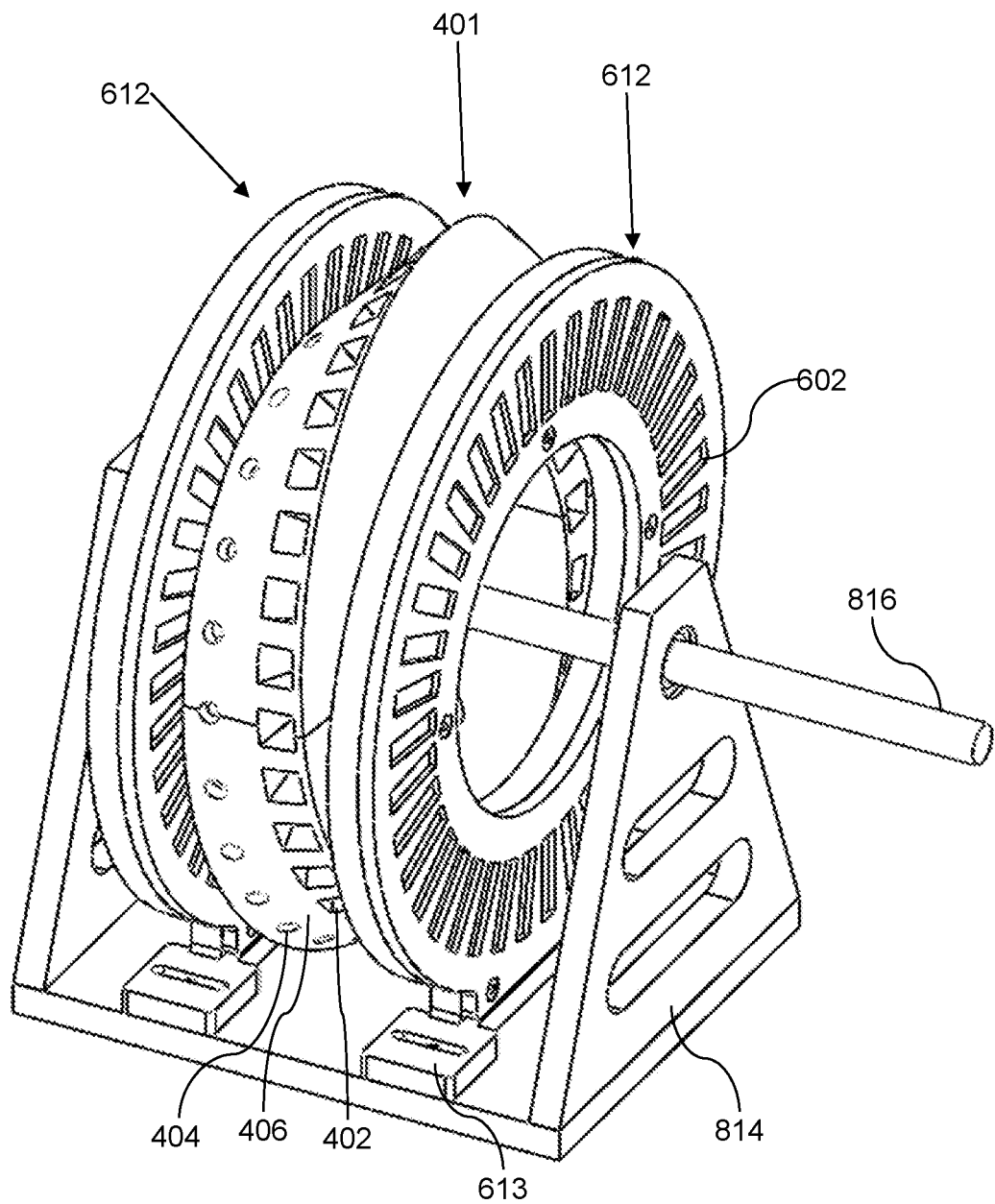
FIG. 8A is a schematic illustration of the driving portion of a magnetic generator in accordance with an embodiment of the current invention.

FIG. 8A is a schematic illustration of the driving portion of a magnetic generator in accordance with an embodiment of the current invention. In some, mounts 402 for magnets may be arranged in a progressively changing orientation according to the face of a twisted band (e.g., 401, 101 for example a mobius strip) on a rotor. For example, mounts 402 are placed perpendicular to the face twisted band 401. Optionally the rotor is mounted on an axle 816. In some embodiments, the rotor is positioned between stationary arrays of magnets (for example discs/plates 612 may have magnets positioned in mounts 602). Optionally, the stationary magnets are all oriented in the same direction and/or arranged in a circular array. The magnets may include permanent magnets and/or electromagnets. The magnetic fields between the stationary magnets and the magnets mounted on the rotor optionally cause the rotor to rotate and/or rotate the axle 816. Power from the rotating rotor may be used to drive a generator and/or produce electricity. Alternatively or additionally, the stationary magnets may be arranged in progressively changing orientation and/or the magnets of the rotor may have a single orientation.

In some embodiments, the stationary magnets may be mounted on a disc/plate 612 include a mount for magnets 210. For example, two plates 621a, 621b may include indentations and/or holes into which fit the magnets 210. Optionally, the magnets 210 are held between the two plates 621a, 621b. The plates are optionally held together by nuts 622a and bolts 622b. Optionally, the disc/plate 612 includes a mount 613 configured for attachment to a chassis (e.g., as illustrated in FIG. 8). In some embodiments, the permanent magnets 210 are dipoles and/or all of the dipoles are oriented in the same direction. For example, the axis between the poles 211a, 211b may be perpendicular to the face of the disc and/or parallel to the axis of the circular pattern of the magnet mounts 602.

In some embodiments, stationary plates 612 are rigidly mounted to a chassis 814. Optionally, band 401 is rigidly mounted on an axle 816. For example, axle 816 and/or band 401 are supported and/or rotate freely with respect to the chassis 814 and/or discs/plates 612. Axle 816 is optionally connected to a generator such that rotation of axle 816 generates electricity. Alternatively or additionally, twisted band 401 may be mounted rigidly to the chassis and/or discs/plates 612 may be rotate and/or rotate and axle 816. For example, the stationary magnets may be stationary with respect to a chassis 814 and/or the rotor may rotate with respect to the chassis and/or the axle 816 may rotate with respect to the chassis 814. Optionally, the axis between poles of the permanent magnets is parallel to the axle 816 of the rotating band 401. Optionally, the mounts 602 for magnets on plate/disc 612 are arranged in a circular array and/or around axle 602. For example, the mounts may be arrayed on a surface perpendicular to axle 816.

In some embodiments, magnetic forces between the magnets on band 401 and discs/plates 612 may cause band 401 to rotate with respect to discs/plates 612. Optionally, stationary discs/plates 612 are supplied with several electro magnets installed on the disc/plate 612 in mounts 602 in dedicated locations and orientations. The twisted band 401 optionally includes mounts 402 for several permanent magnets 210 to be installed in dedicated locations and orientations.

Alternatively or additionally, stationary discs/plates 612 are supplied with several permanent magnets installed on the disc/plate in mounts 602 in dedicated locations and orientations.

FIG. 8B is a schematic illustration of the positioning of magnets in the driving portion of a magnetic generator in accordance with an embodiment of the current invention.

Figure 9A:
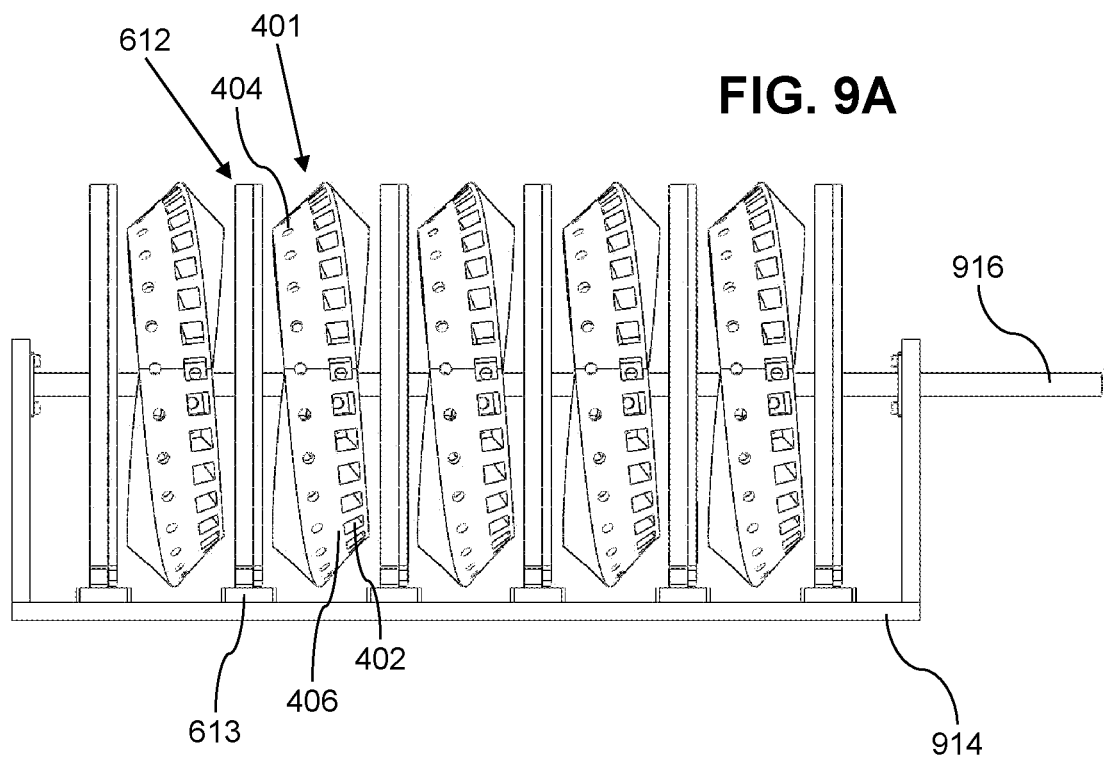
FIG. 9A is a schematic orthogonal side view of a 5 spinning twisted band system in accordance with an embodiment of the current invention.
Figure 9B:
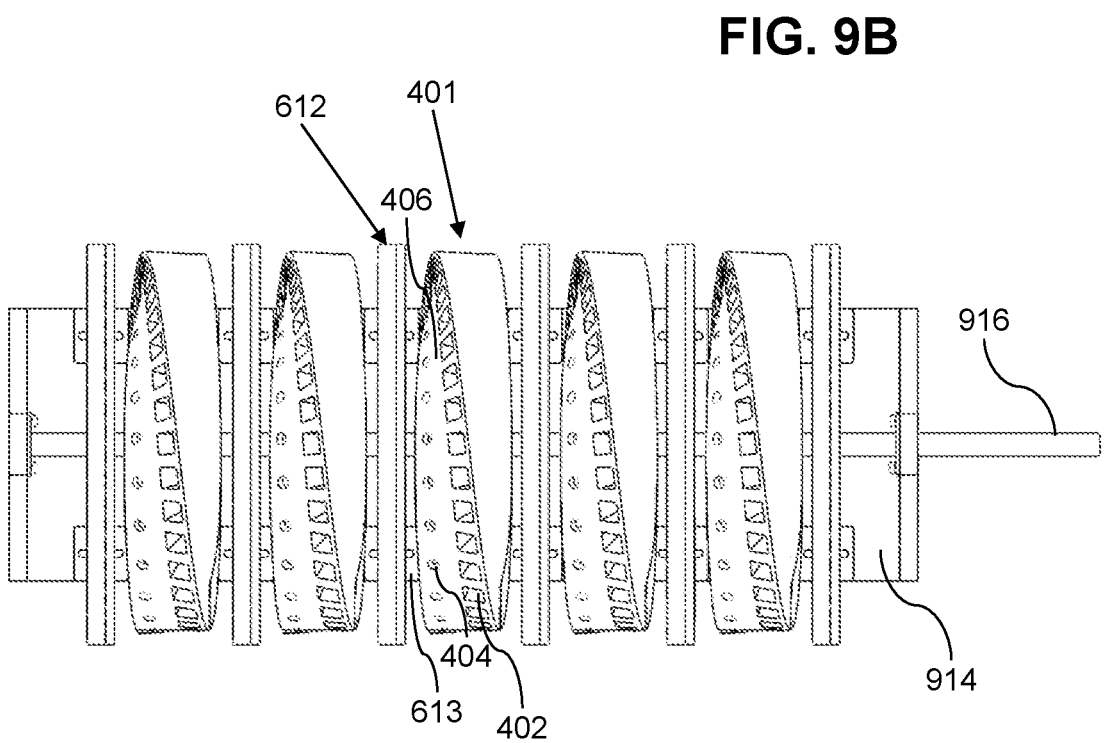
FIG. 9B is a schematic orthogonal overhead view of a 5 spinning twisted band system in accordance with an embodiment of the current invention.

FIGS. 9A and 9B are schematic orthogonal side and overhead views respectfully of a 5 spinning twisted band system in accordance with an embodiment of the current invention. In some embodiments, a plurality of rotators (e.g., twisted bands 401) may been be driven to rotate by a series of static magnetic plate/discs 612. For example, the rotors may drive an axle 916 to rotate with respect to the stators and/or a chassis 914.

Figure 10:
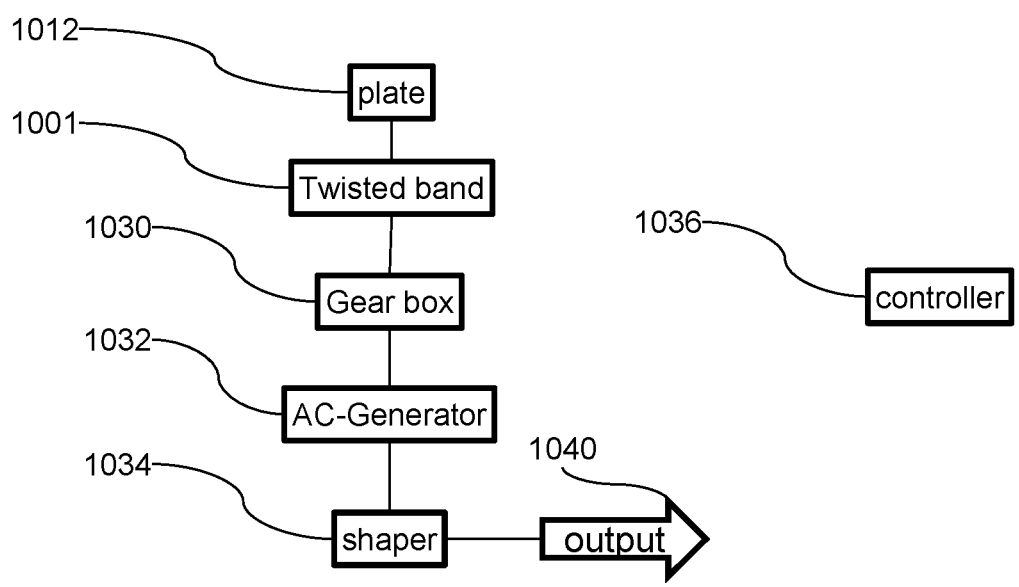
FIG. 10 is a block-diagram illustration of a system for generating AC power in accordance with some demonstrative embodiments of the present invention.
Figure 16:
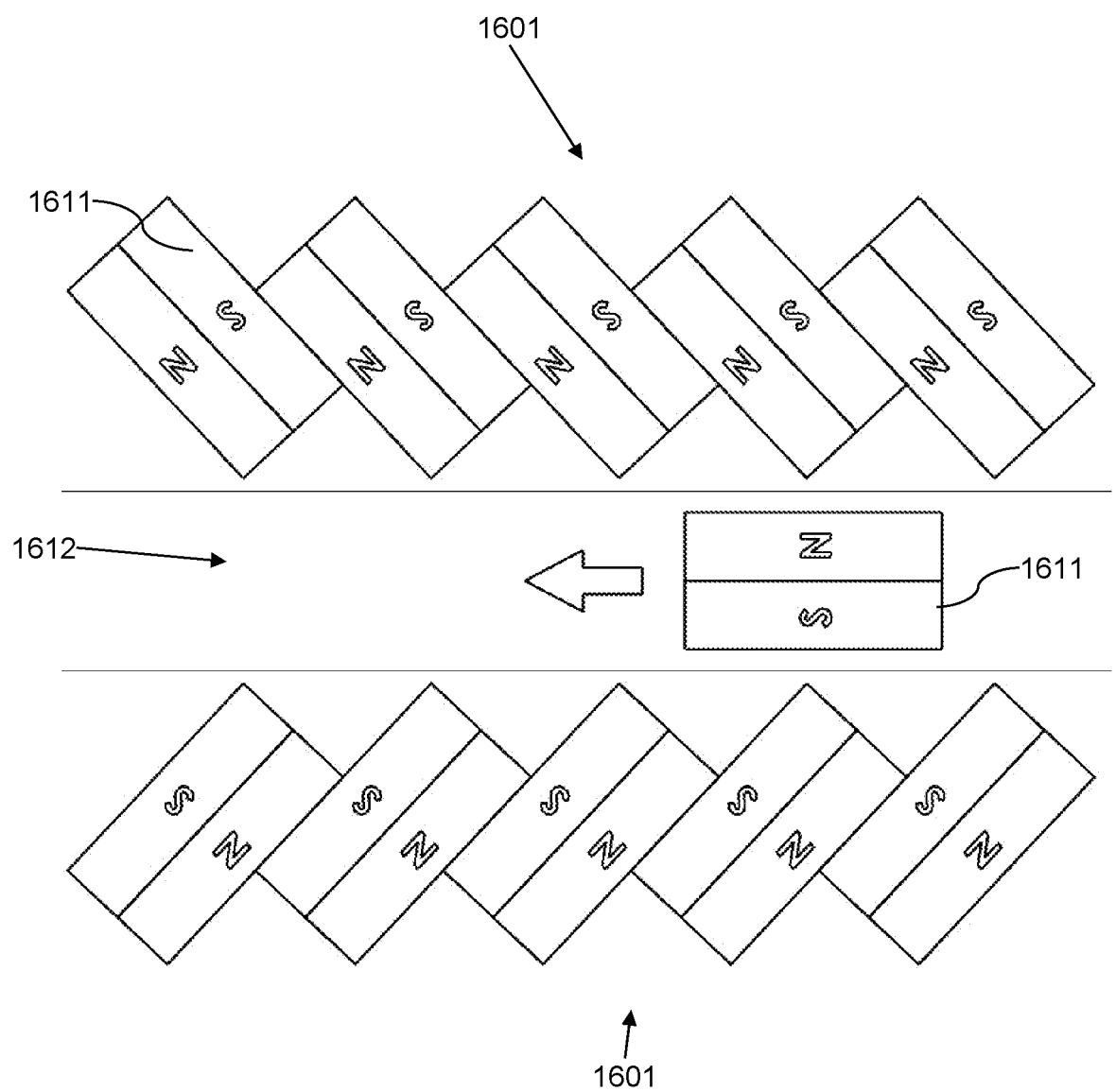
FIG. 16 is a schematic diagram of a rotating disc surrounded by twist mounted magnets in accordance with an embodiment of the current invention.
Figure 18A:
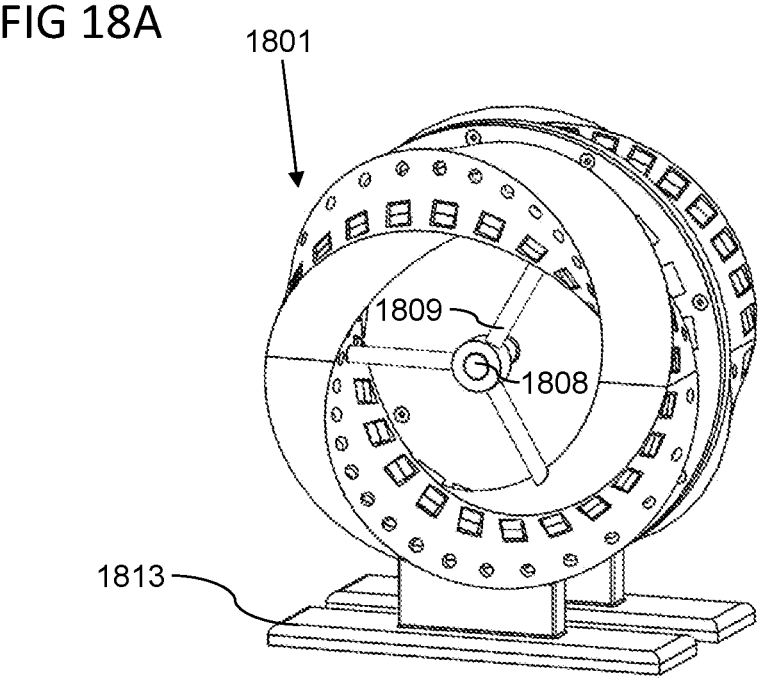
FIG. 18A is a schematic perspective view of a plate/disc rotor surrounded by twisted band stators in accordance with an embodiment of the current invention.
Figure 18B:
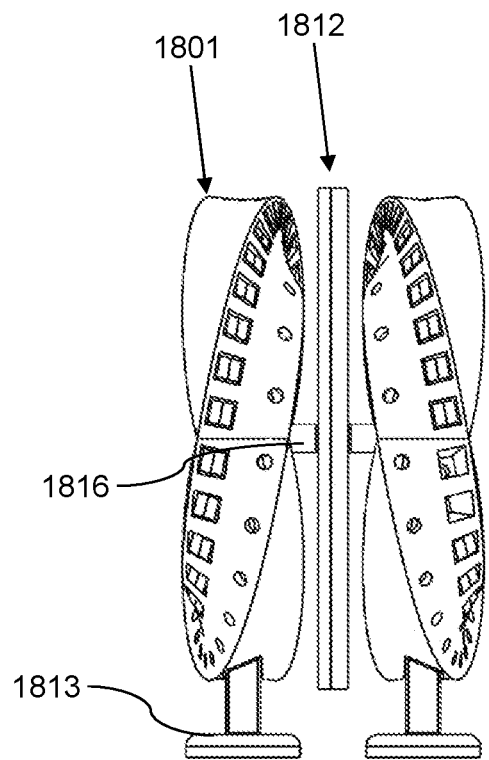
FIG. 18B is a schematic perspective view of a plate/disc rotor surrounded by twisted band stators in accordance with an embodiment of the current invention.

FIG. 10 is a block-diagram illustration of a system for generating AC power in accordance with some demonstrative embodiments of the present invention. For example, a driver may include a twisted band 1001 of magnets (e.g., as illustrated herein above band 101, 401) and/or a plate 1012 or plates of magnets (e.g., as illustrated herein above plate 612). Optionally, band 1001 may be a rotor and/or plate 1012 may be a stator. Alternatively or additionally, band 1001 may be stator and/or plate 1012 may be rotor. Alternatively or additionally, the twisted band 1001 might be stator and/or plate 1012 may be rotor for example as illustrated in FIGS. 16, 18A, 18B.

Optionally the rotor drives a gear box 1030 which in turn drives an AC generator 1032. Power from the generator is adjusted, for example, by a power shaper 1034 (for example including a transformer and/or a pulse width modulator PWM circuit and/or switches and/or breakers and/or fuses etc.). Optionally the system controlled by a controller 1036. For example, controller 1036 may control rotation of the rotor and/or action of the generator 1032 and/or shaper 1034 to achieve a desired output power 1040 and/or form. For example, a system such as the one illustrated in FIG. 10 may be used in a utility power station and/or a portable generator and/or a home generator and/or a vehicle (e.g., a car and/or a truck and/or a ship etc.).

Figure 11:
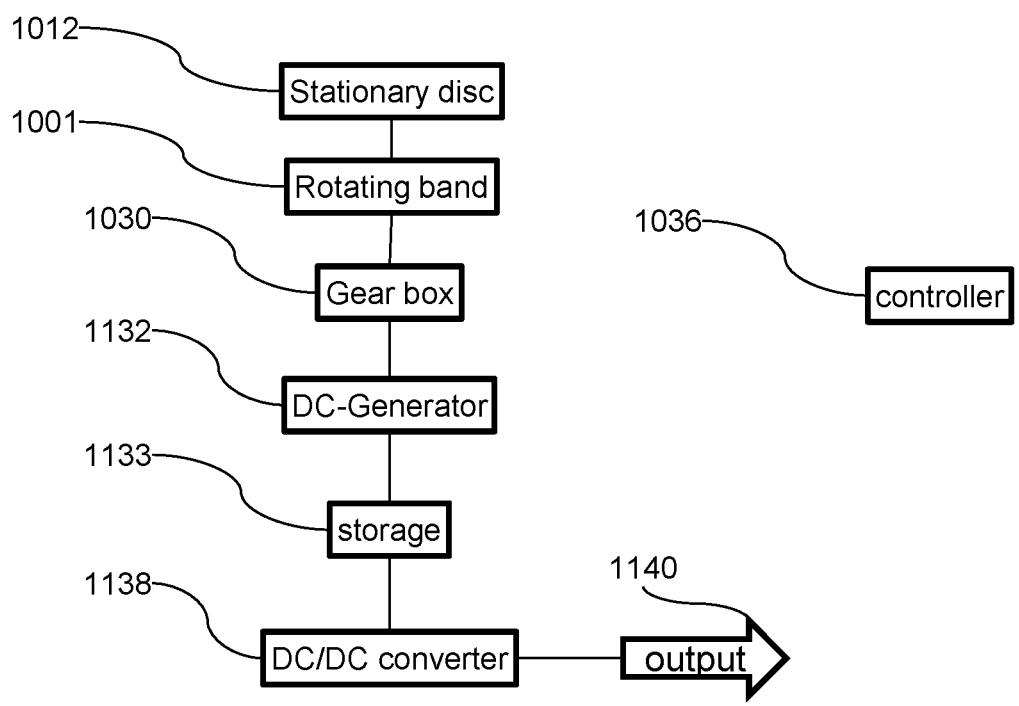
FIG. 11 is a block-diagram illustration of a system for generating DC power in accordance with some demonstrative embodiments of the present invention.

FIG. 11 is a block-diagram illustration of a system for generating DC power in accordance with some demonstrative embodiments of the present invention. For example, a driver may include a twisted band 1001 of magnets (e.g., as illustrated herein above band 101, 401) and/or a plate 1012 of magnets (e.g., as illustrated herein above plate 612). Optionally, band 1001 may be a rotor and/or plate 1012 may be a stator. Alternatively or additionally, band 1001 may be stator and/or plate 1012 may be rotor. Optionally the rotor drives a gear box 1030 which in turn drives an DC generator 1132. Power from the generator is adjusted, for example, by a power shaper 1134 (for example including a DC-DC converter 1138 and/or a pulse width modulator PWM circuit and/or a rectifier and/or switches and/or breakers and/or fuses etc.). In some embodiments the system includes energy storage 1133 (for example a battery and/or a capacitor and/or a super capacitor). For example, the energy storage may facilitate delivering controlled power under shifting supply and/or load and/or when the system is exposed to perturbations (e.g., vibration). Optionally the system controlled by a controller 1036. For example, controller 1036 may control rotation of the rotor and/or action of the generator 1132 and/or shaper 1134 to achieve a desired output power 1140 and/or form. For example, the system described in FIG. 11 may be used, for example, to power a battery and/or a computer and/or a data center and/or a vehicle (e.g., a car and/or a truck and/or a ship etc.).

Figure 12:
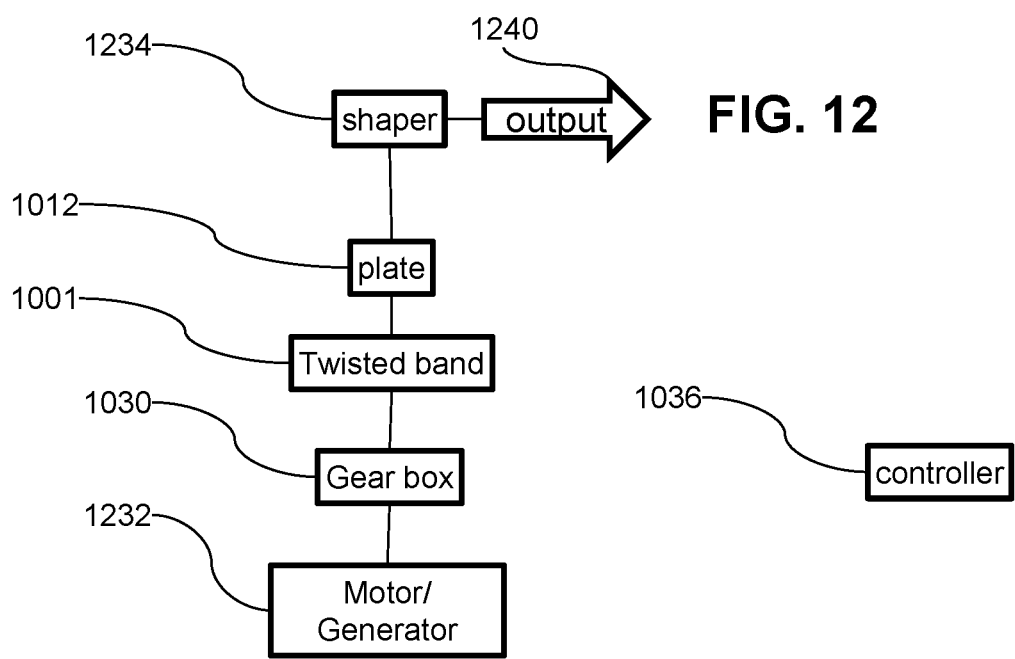
FIG. 12 is a schematic block-diagram illustration of generator system, in accordance with some demonstrative embodiments of the present invention.

FIG. 12 is a schematic block-diagram illustration of generator system, in accordance with some demonstrative embodiments of the present invention. In some embodiments, a motor 1232 may drive a rotor to produce electrical power. For example, the rotor may include a twisted band 1001 of magnets (e.g., as illustrated herein above band 101, 401) which induces power in a stator (e.g., a plate/disc 1012 of magnets e.g., as illustrated plate/disc 612). Optionally, the power is harvested and sent to a shaper 1234 (for example including a transformer and/or a DC-DC converter 1138 and/or a pulse width modulator PWM circuit and/or a rectifier and/or switches and/or breakers and/or fuses etc.) to output a desired power 1240 and/or form. For example, controller 1036 may control rotation of the rotor and/or action of the shaper 1234 to achieve a desired output power and/or form. For example, the system described in FIG. 12 may be used, for example, to power a battery and/or a computer and/or a data center and/or a vehicle (e.g., a car and/or a truck and/or a ship and/or an urban power station and/or a portable generator etc.).

Figure 13:
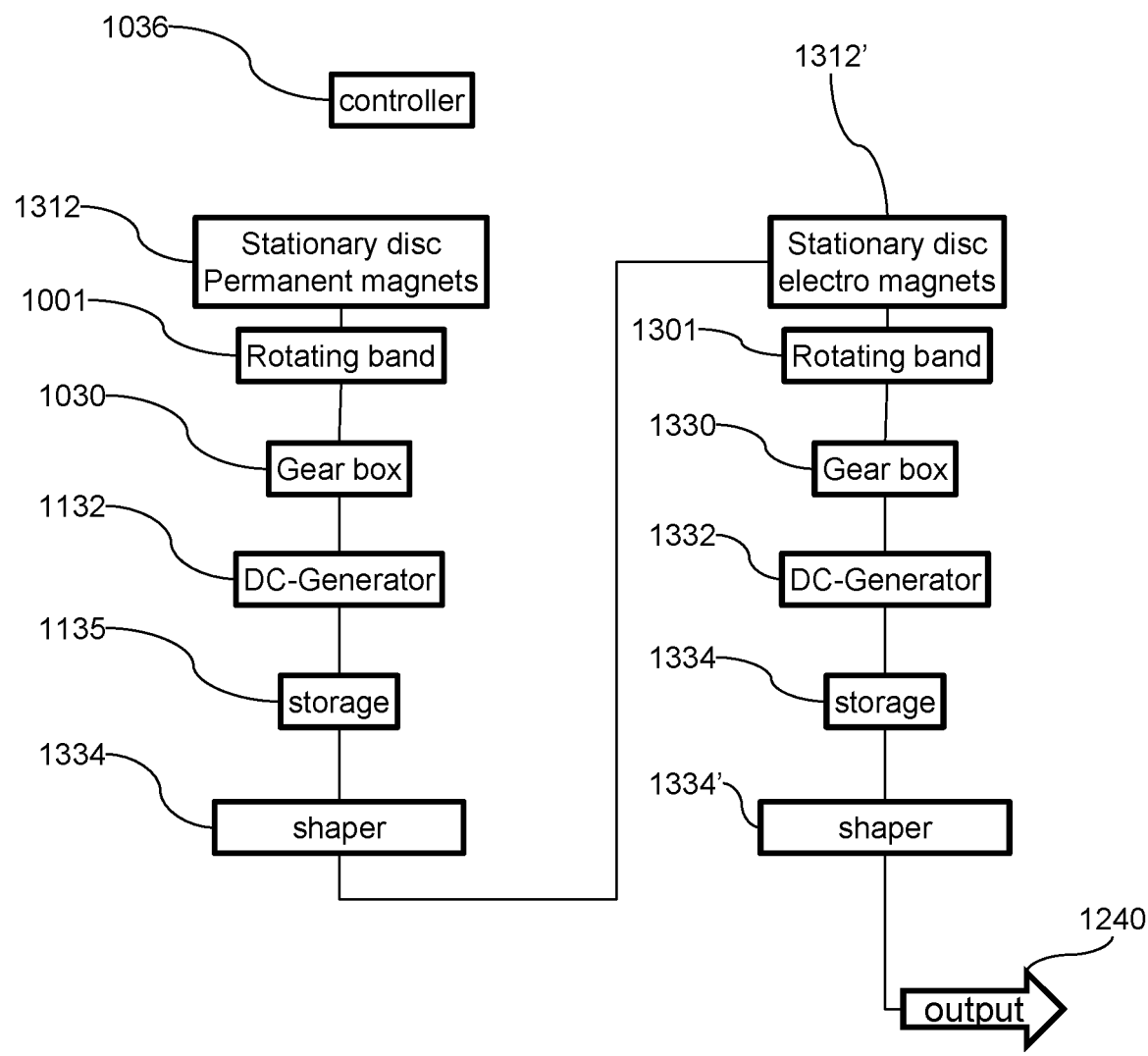
FIG. 13 is a block diagram of a staged system in accordance with an embodiment of the current invention.

FIG. 13 is a block diagram of a staged system in accordance with an embodiment of the current invention. Optionally, a system may include multiple stages. For example, there may be a first stage (for example including a generator similar to the system of FIG. 11 alternatively or additionally similar to the systems of FIG. 10 or FIG. 12). For example, the stator 1312 and/or rotor 1001 of the first stage may use permanent. Output of the first stage generator may be shaped by a shaper 1334 and/or used to supply power to electromagnets (for example of stator 1312') of a second stage generator. The second stage is optionally operating at much higher power than the first stage. For example, the second stage may have larger and/or more advanced stator 1312' and/or rotor 1301 and/or gear box 1330 and/or generator 1332 and/or storage 1334 and/or power shaper 1334'. Optionally, various stages of the system may be controlled by a central controller 1036 to achieve a desired output 1240. In some embodiments a multistage system may have more than two stages (for example above there is described a 5-stage system).

Figure 14:
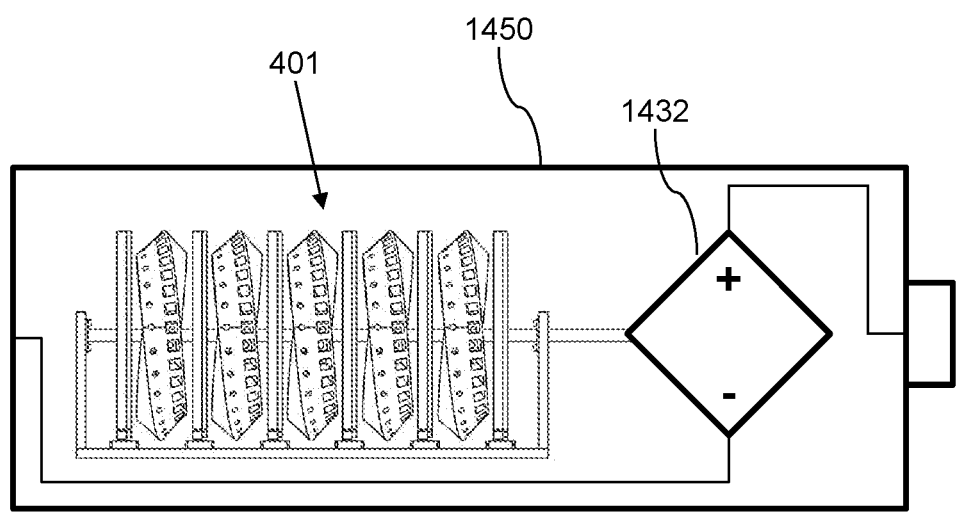
FIG. 14 is a schematic block-diagram illustration of small battery 1450 system, in accordance with some demonstrative embodiments of the present invention.

FIG. 14 is a schematic block-diagram illustration of small battery 1450 system, in accordance with some demonstrative embodiments of the present invention. For example, a miniaturized driving system (e.g., a miniature version of system of FIG. 4) based on a twisted band of magnets and/or a disc/plate of magnets drives a generator 1432 to produce electric power. For example, the entire system may be designed to fit in a standard battery (e.g., D-cell, C-cell, A-cell, AA-cell and/or AAA-cell). Optionally, the generator 1432 may include energy storage, for example a super capacitor. For example, replacement batteries 1450 may save the environment of chemicals used to make batteries and/or their disposal and/or the energy needed to charge such batteries.

Figure 15:
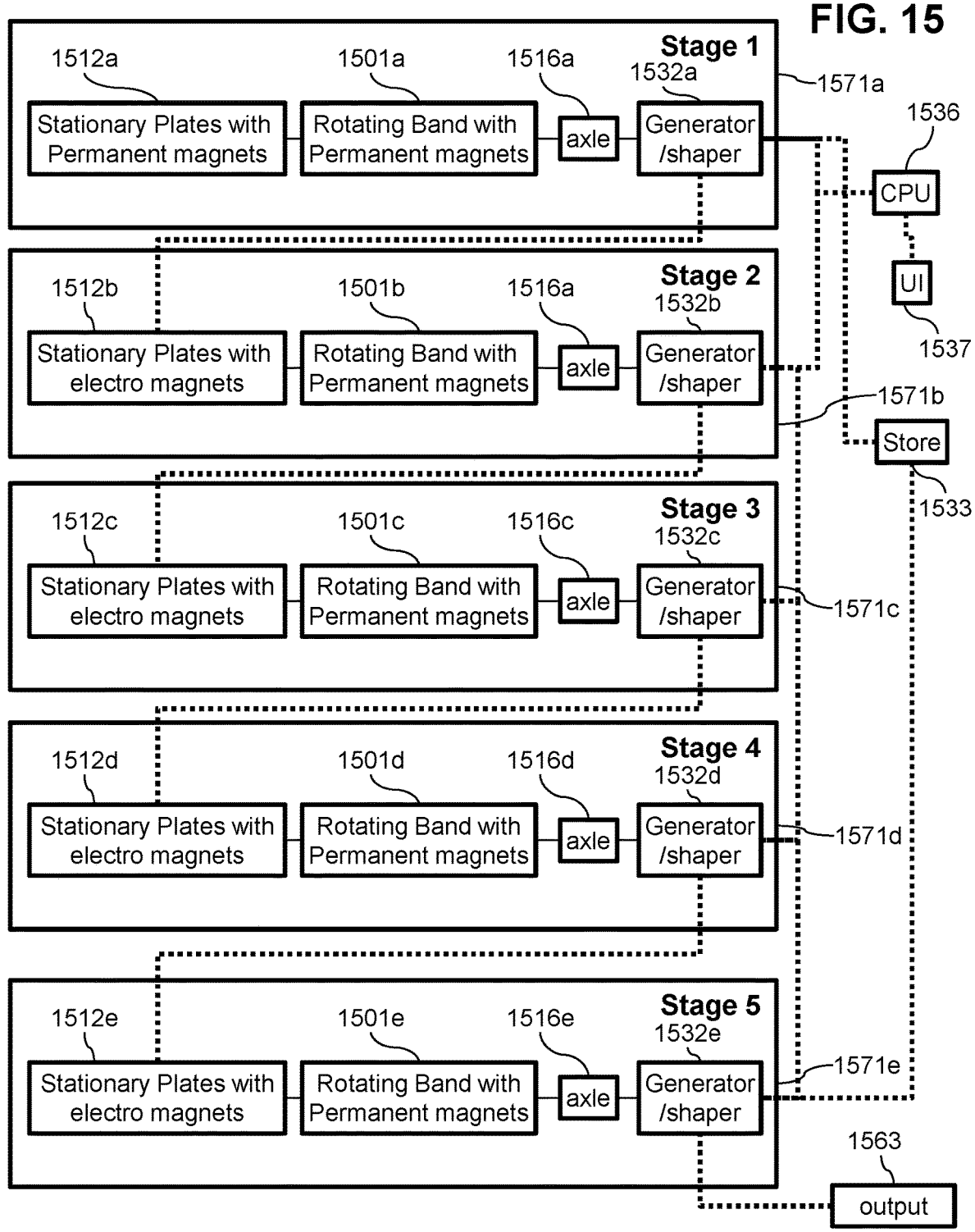
FIG. 15 is a block diagram of a five-stage system in accordance with an embodiment of the current invention.

FIG. 15 is a block diagram of a five-stage system in accordance with an embodiment of the current invention. In some embodiments, a first stage includes one or more stationary plates 1512a with permanent magnets and/or one or more rotating twisted bands 1501a (for example, one or more twisted bands 1501a may be surrounded by a pair of stationary discs 1512a (for example as illustrated in FIGS. 8 to 9B)). Other geometries are possible (for example as illustrated in FIGS. 18A, 18B). Optionally, the rotating disc(s) 1512a drive an axle 1516a which optionally powers a generator 1532a, for example, output power from a first stage 1571a may power a second stage 1571b (for example, electromagnets on a stationary plate 1512b)

In some embodiments, power from the any stage 1571a, 1571b, 1571c, 1571d, 1571e, may be stored in a storage module 1533 (e.g., a battery and/or a capacitor and/or a super capacitor) and/or set to an output 1563 (for example, power grid and/or a machine that needs power) and/or to a controller 1536. Optionally, controller 1536 controls the system, for example the rate of rotation of each stage 1571a, 1571b, 1571c, 1571d, 1571e and/or power input of each stage 1571a, 1571b, 1571c, 1571d, 1571e and/or the form (AC/DC voltage, frequency, current) of output of each stage 1571a, 1571b, 1571c, 1571d, 1571e. The controller 1536 optionally includes a user interface 1537. For example, a human operator may control the system using the user interface 1537.

In some embodiments, a second stage 1571b. includes one or more stationary plates 1512b with electro magnets (for example powered by the first stage 1571a) and/or one or more rotating twisted bands 1501b (for example, one or more twisted bands 1501b may be surrounded by a pair of stationary discs 1512b (for example as illustrated in FIGS. 8 to 9B)). Other geometries are possible (for example as illustrated in FIGS. 18A, 18B). Optionally, the rotating disc(s) 1512b drive an axle 1516b which optionally powers a generator 1532b, for example, output power from a second stage 1571b may power a third stage 1571c (for example, electromagnets on a stationary plate 1512c)

In some embodiments, a third stage 1571c. includes one or more stationary plates 1512c with electro magnets (for example powered by the second stage 1571b) and/or one or more rotating twisted bands 1501c (for example, one or more twisted bands 1501c may be surrounded by a pair of stationary discs 1512c (for example as illustrated in FIGS. 8 to 9B)). Other geometries are possible (for example as illustrated in FIGS. 18A, 18B). Optionally, the rotating disc(s) 1512c drive an axle 1516c which optionally powers a generator 1532c, for example, output power from a third stage 1571c may power a fourth stage 1571d (for example, electromagnets on a stationary plate 1512d)

In some embodiments, a fourth stage 1571d. includes one or more stationary plates 1512d with electro magnets (for example powered by the third stage 1571c) and/or one or more rotating twisted bands 1501d (for example, one or more twisted bands 1501d may be surrounded by a pair of stationary discs 1512*d* (for example as illustrated in FIGS. 8 to 9B)). Other geometries are possible (for example as illustrated in FIGS. 18A, 18B). Optionally, the rotating disc(s) 1512*d* drive an axle 1516*d* which optionally powers a generator 1532*d*, for example, output power from a fourth stage 1571*d* may power a fifth stage 1571*e* (for example, electromagnets on a stationary plate 1512*e*)

In some embodiments, a fifth stage 1571*e*. includes one or more stationary plates 1512*e* with electro magnets (for example powered by the fourth stage 1571*d*) and/or one or more rotating twisted bands 1501*e* (for example, one or more twisted bands 1501*e* may be surrounded by a pair of stationary discs 1512*e* (for example as illustrated in FIGS. 8 to 9B)). Other geometries are possible (for example as illustrated in FIGS. 18A, 18B). Optionally, the rotating disc(s) 1512*e* drive an axle 1516*e* which optionally powers a generator 1532*e*, for example, output power from a fourth stage 1571*e* may output 1563 power. Optionally in each subsequent stage 1571*a*, 1571*b*, 1571*c*, 1571*d*, 1571*e* the power becomes greater and/or higher duty parts are used. In some embodiments, the eventually output power 1563 may be very great indeed.

FIG. 16 is a schematic diagram of a rotating disc 1601 surrounded by twist mounted magnets 1611 in accordance with an embodiment of the current invention. For example, a rotor may include a disc/plate 1612 with magnets 1611. Optionally the magnets of the rotor interact with the magnets 1611 of a stator (for example a twisted band 1601) to rotate the rotor and/or drive a generator.

Figure 17:
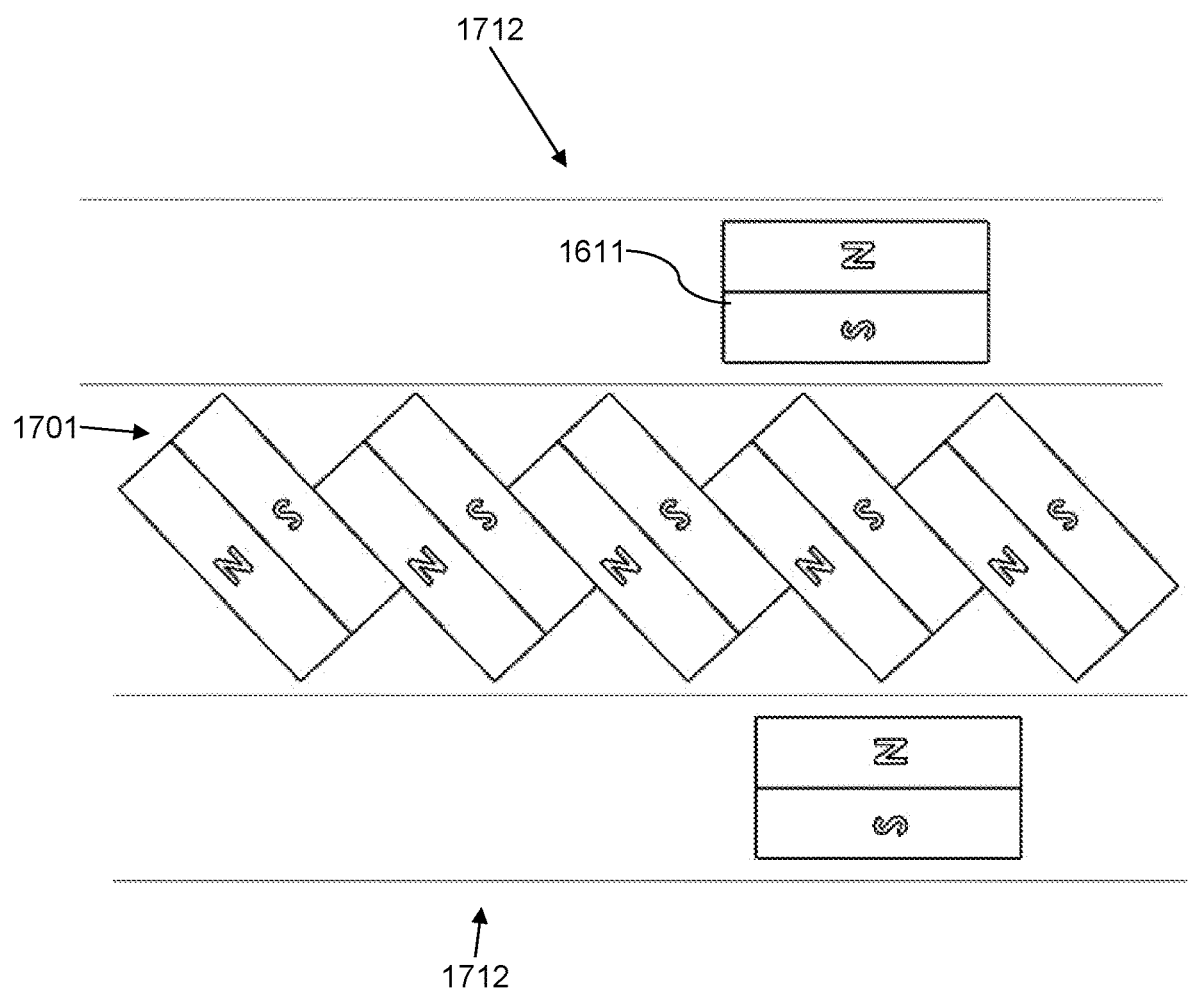
FIG. 17 is a schematic diagram of rotating twist mounted magnets surround by stationary discs in accordance with an embodiment of the current invention.

FIG. 17 is a schematic diagram of a rotating twisted band 1701 surrounded by plate/disc 1712 mounted magnets 1611 in accordance with an embodiment of the current invention. For example, a rotor may include a twisted band 1701 with magnets 1611. Optionally the magnets of the rotor interact with the magnets 1611 of a stator (for example a stationary plate/disc 1712) to rotate the rotor and/or drive a generator.

FIG. 17 is a schematic diagram of rotating twist mounted magnets 1611 surround by stationary discs 1712 in accordance with an embodiment of the current invention.

FIG. 18B is a schematic perspective view of a plate/disc 1812 rotor surrounded by twisted band stators 1801 in accordance with an embodiment of the current invention. Optionally the stators are supported by bases 1813. In some embodiments, the rotor includes an axle mount 1808 and/or spokes 1809. Optionally, the axle mount 1808 holds an axle 1816 which is rotated by the rotor, for example, to drive a generator.

Figure 19:
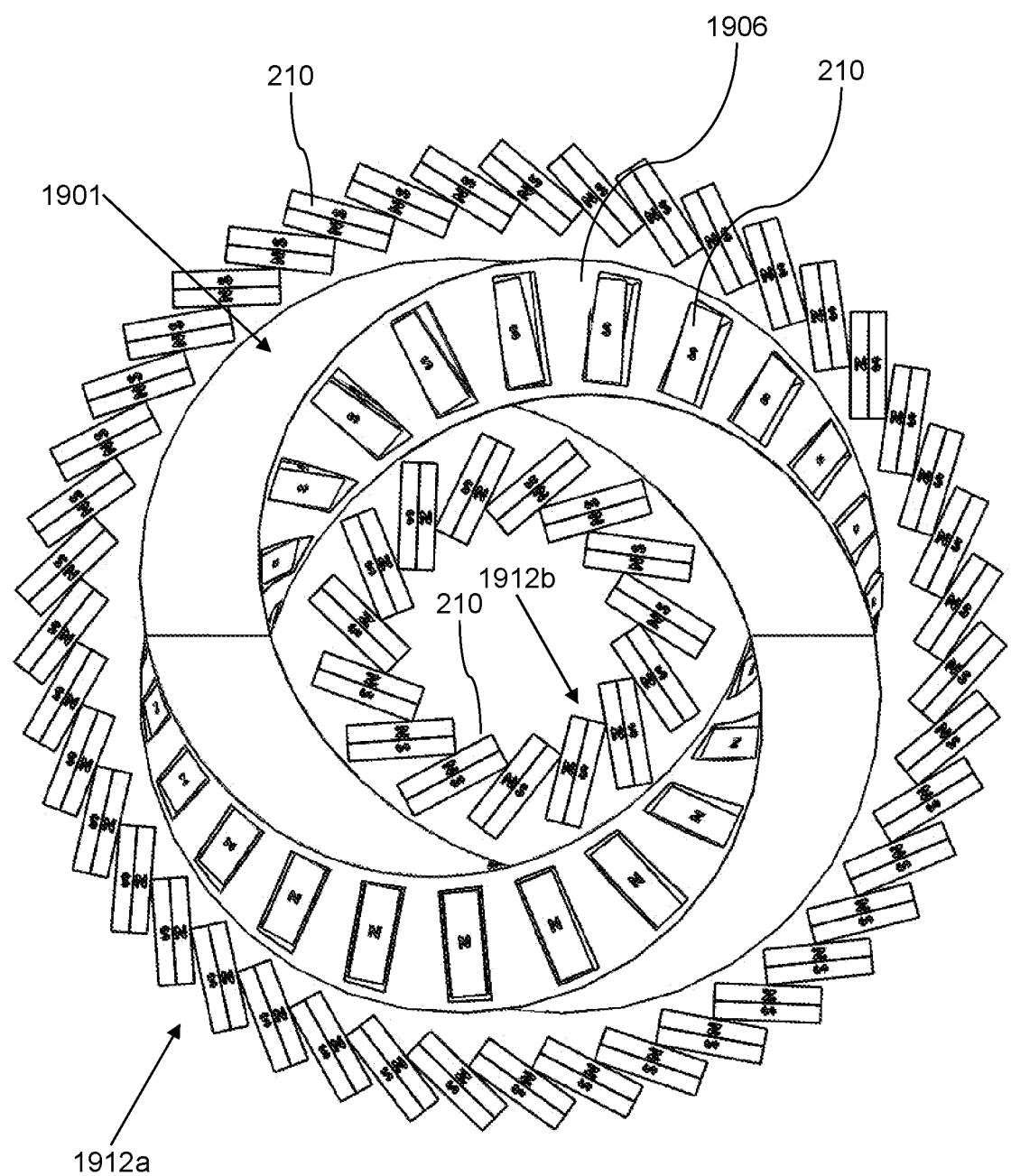
FIG. 19 is a schematic orthogonal view of a twisted band surrounded inside and outside by stationary magnets in accordance with an embodiment.

FIG. 19 is a schematic orthogonal view of a twisted band 1901 surrounded inside and outside by stationary magnets in accordance with an embodiment. In some embodiments, a ring of magnets (e.g. a twisted band 1901 with magnets 210 arranged along a face 1906 thereof. For example, the band 1901 may rotate and interact magnetically with an inner arrangement (e.g., on a plate 1912*b* and/or disk) of stationary magnets 210 and/or an outer arrangement (e.g., on a plate 1912*a* and/or disk) of stationary magnets 210. Alternatively or additionally, a band may interact with magnet in any and/or all sides (for example on one or both side e.g., as illustrated in FIGS. 8A and 8B and/or inside and/or outside the band (e.g., as illustrated in FIG. 19).

It is expected that during the life of a patent maturing from this application many relevant energy storage, generating and shaping technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for power generation comprising:
a first array of magnets variable oriented according to a surface of a twisted band, wherein magnets of said first array are mounted to said twisted band with an axis between poles thereof perpendicular to an edge of said surface;
a second array of magnets on a stator, each magnet of said array having an axis between poles; thereof fixed in relation to the stator;
wherein said second array of magnets are electromagnets whose magnetic field polarity is reversed in direction and whose magnetic field strength is changed by changing an applied current;
wherein interaction between the first array of magnets and the second array of magnets rotates a rotor;
wherein power from rotation of the rotor is used to generate electrical power.

2. The system of claim 1, wherein said first array is on said rotor.

3. The system of claim 2, said second array is circular.

4. The system of claim 2, wherein a pair of said stators are mounted on opposite sides of said rotor.

5. The system of claim 1, wherein said rotor includes a twisted band and wherein magnets of said first array are mounted to said twisted band with an axis between poles of the magnet parallel to a surface of the band which the magnets cross.

6. The system of claim 1, wherein said rotor includes a twisted band and wherein magnets of said first array are mounted to said twisted band with an axis between poles of the magnet perpendicular to a surface of the band.

7. The system of claim 1, wherein said second array is on said rotor and said first array is on a stator.

8. The system of claim 1, wherein said rotor drives a generator.

9. The system of claim 1, further comprising a shell of a standard battery and wherein the generator is packaged in said shell and supplies a standard power output as a battery.

10. The system of claim 1, wherein said electric power is used to drive an electromagnet of a further stage generator further comprising:
a third array of magnets variable oriented according to a surface of a second twisted band, wherein magnets of said third array are mounted to said twisted band with an axis between poles thereof perpendicular to an edge of said surface;
a fourth array of magnets on a stator, each magnet of said array having an axis between poles thereof fixed in relation to the stator;
wherein said fourth array of magnets are electromagnets whose magnetic field polarity is reversed in direction and whose magnetic field strength is changed by changing an applied current;
wherein at least one of said third and fourth array includes said electromagnet of said further stage generator;
wherein interaction between the first array of magnets and the second array of magnets rotates a rotor;
wherein power from rotation of the rotor is used to generate electrical power.

11. The system of claim 1, wherein said twisted band is a mobius strip.

12. The system of claim 1, wherein said twisted band is twisted.

* * * * *